US012689624B2

(12) United States Patent
Lin et al.

(10) Patent No.: US 12,689,624 B2
(45) Date of Patent: Jul. 21, 2026

(54) ACCESS PROCESSING METHOD AND DEVICE FOR REMOTELY CONTROLLING TERMINAL AND STORAGE MEDIUM

(71) Applicant: Tencent Cloud Computing (Beijing) Co., Ltd., Beijing (CN)

(72) Inventors: Zhixin Lin, Beijing (CN); Zhen Deng, Beijing (CN); Quan Zhou, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 391 days.

(21) Appl. No.: 18/128,001

(22) Filed: Mar. 29, 2023

(65) Prior Publication Data

US 2023/0239294 A1 Jul. 27, 2023

Related U.S. Application Data

(63) Continuation of application No. PCT/CN2021/108920, filed on Jul. 28, 2021.

(30) Foreign Application Priority Data

Apr. 30, 2021 (CN) .......................... 202110481961.9

(51) Int. Cl.
*H04L 9/40* (2022.01)

(52) U.S. Cl.
CPC ...... *H04L 63/0884* (2013.01); *H04L 63/0876* (2013.01)

(58) Field of Classification Search
CPC ............. H04L 63/0884; H04L 63/0876; H04L 63/083; H04L 63/08; G05B 19/0423; G05B 2219/23051
See application file for complete search history.

(56) References Cited

U.S. PATENT DOCUMENTS

2010/0088507 A1* 4/2010 Cho .......................... G06F 21/33
713/156
2013/0205136 A1* 8/2013 Kirsch .................. G06F 21/335
713/168
(Continued)

FOREIGN PATENT DOCUMENTS

CN        102769628 A     11/2012
CN        104253845 A     12/2014
(Continued)

OTHER PUBLICATIONS

International Search Report for PCT/CN2021/108920 dated Dec. 7, 2021 (PCT/ISA/210).
(Continued)

*Primary Examiner* — Khoi V Le
(74) *Attorney, Agent, or Firm* — Sughrue Mion, PLLC

(57) ABSTRACT

An access processing method and apparatus for remotely controlling a terminal, and a storage medium. The method includes: obtaining identity information of a target user from a user terminal, returning a controllable device set corresponding to the target user to the user terminal based on the identity information, receiving, from the user terminal, a target device identifier selected from the controllable device set, and obtaining verification information of a target device indicated by the target device identifier, the verification information including: access information for accessing the target device, and controlling the verification information to be transmitted to the target device to allow, based on verification of the verification information passing, access and remote control on the target device.

20 Claims, 11 Drawing Sheets

(56) References Cited

U.S. PATENT DOCUMENTS

| | | | | |
|---|---|---|---|---|
| 2013/0246664 A1* | 9/2013 | Zheng | ................... | G06F 13/105 |
| | | | | 710/8 |
| 2014/0033286 A1* | 1/2014 | Zhang | ................... | H04W 12/06 |
| | | | | 726/7 |
| 2016/0055322 A1* | 2/2016 | Thomas | ............. | H04L 63/0876 |
| | | | | 726/7 |
| 2018/0137512 A1* | 5/2018 | Georgiadis | ............. | H04L 63/08 |
| 2021/0336966 A1* | 10/2021 | Gujarathi | ............. | H04L 9/3247 |

FOREIGN PATENT DOCUMENTS

| | | | |
|---|---|---|---|
| CN | 105320081 A | 2/2016 |
| CN | 106101186 A | 11/2016 |
| CN | 106330636 A | 1/2017 |
| CN | 110221949 A | 9/2019 |
| CN | 111176237 A | 5/2020 |
| JP | 2013-246664 A | 12/2013 |

OTHER PUBLICATIONS

Written Opinion for PCT/CN2021/108920 dated Dec. 7, 2021 (PCT/ISA/237).
Communication issued Dec. 4, 2024 in Chinese Application No. 202110481961.9.

* cited by examiner

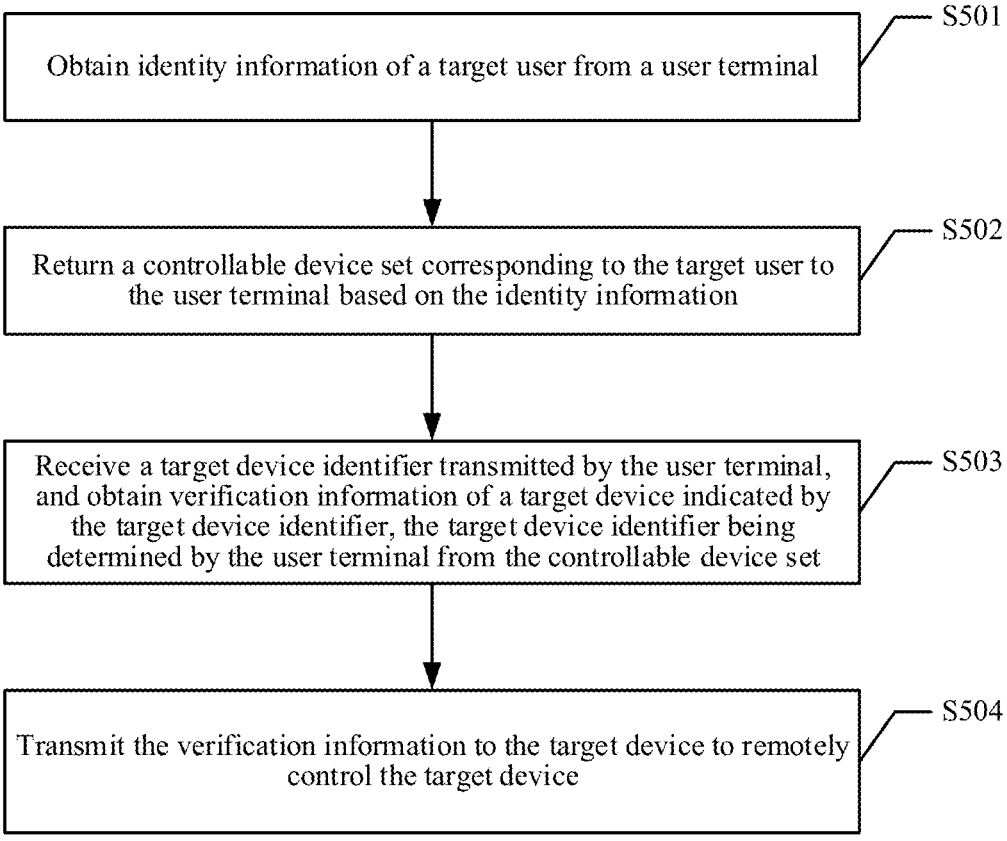

Obtain identity information of a target user from a user terminal — S501

Return a controllable device set corresponding to the target user to the user terminal based on the identity information — S502

Receive a target device identifier transmitted by the user terminal, and obtain verification information of a target device indicated by the target device identifier, the target device identifier being determined by the user terminal from the controllable device set — S503

Transmit the verification information to the target device to remotely control the target device — S504

FIG. 11

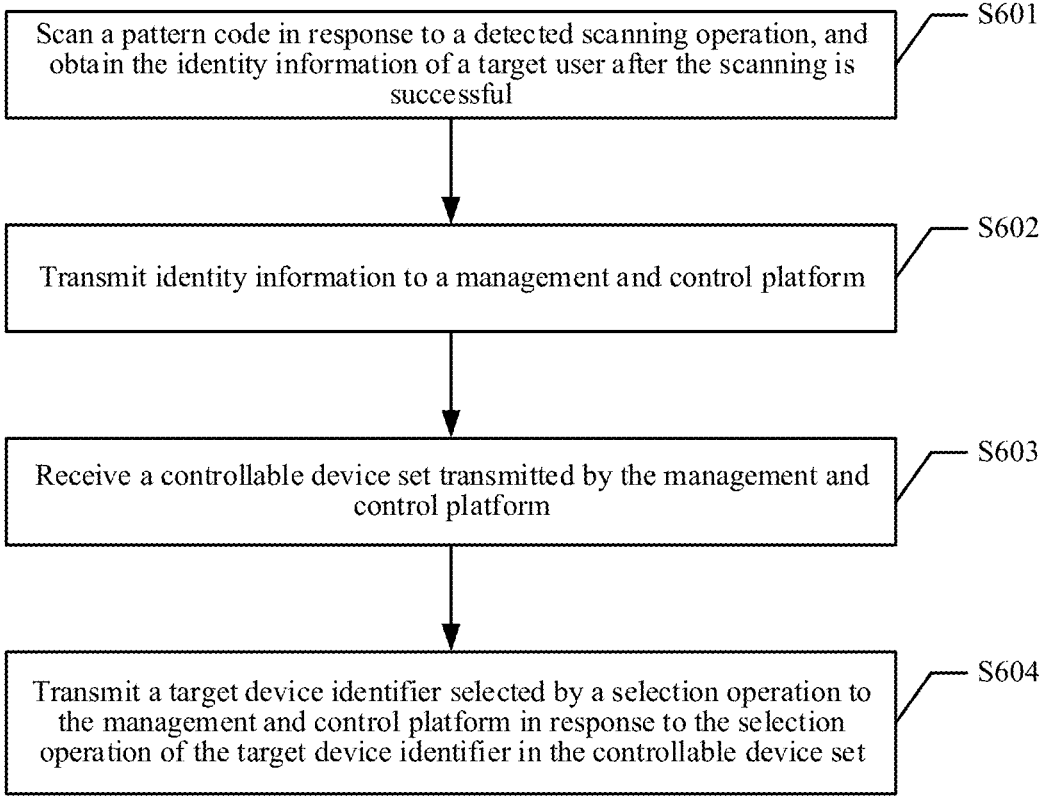

Scan a pattern code in response to a detected scanning operation, and obtain the identity information of a target user after the scanning is successful — S601

Transmit identity information to a management and control platform — S602

Receive a controllable device set transmitted by the management and control platform — S603

Transmit a target device identifier selected by a selection operation to the management and control platform in response to the selection operation of the target device identifier in the controllable device set — S604

FIG. 12

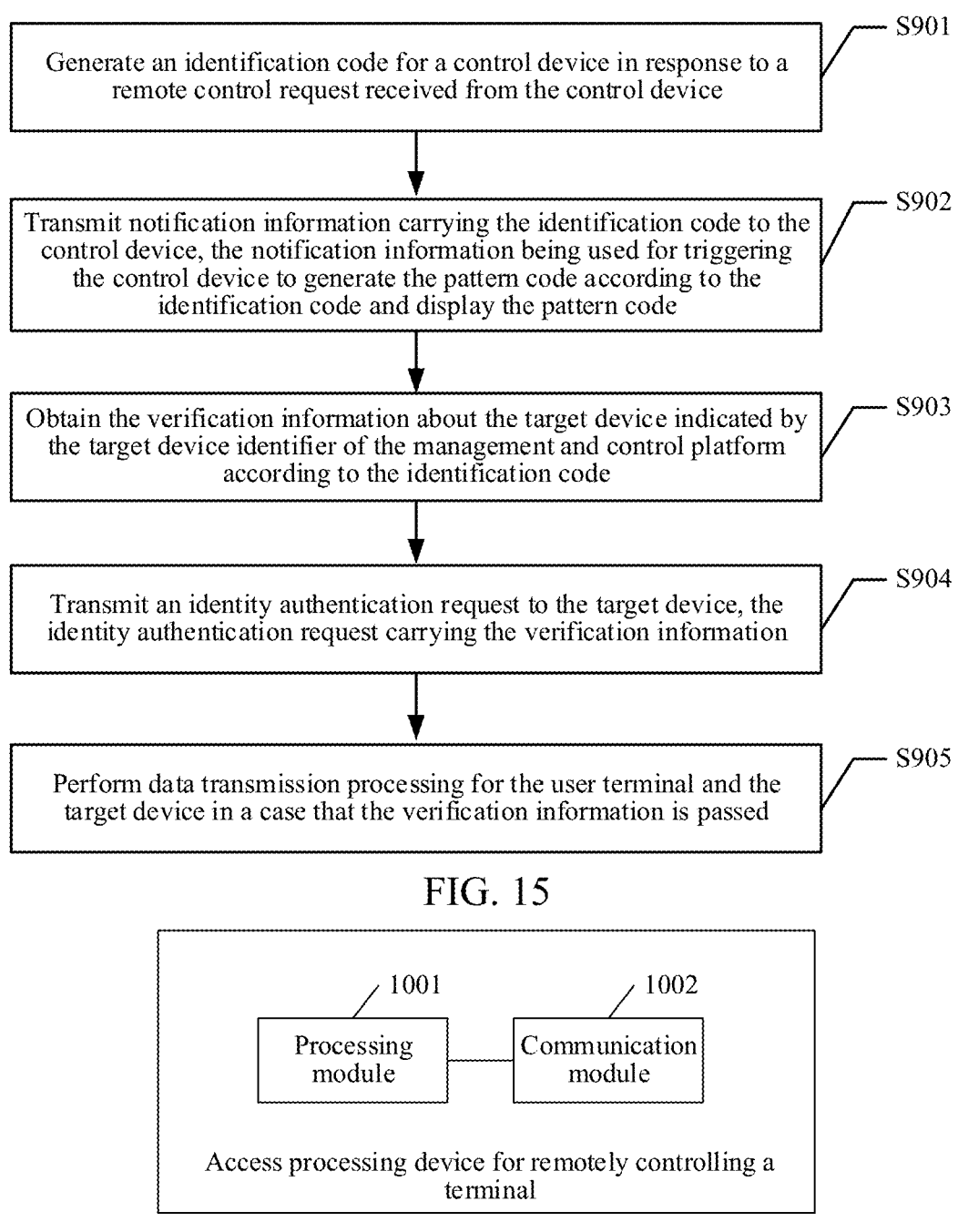

Generate an identification code for a control device in response to a remote control request received from the control device

— S901

Transmit notification information carrying the identification code to the control device, the notification information being used for triggering the control device to generate the pattern code according to the identification code and display the pattern code

— S902

Obtain the verification information about the target device indicated by the target device identifier of the management and control platform according to the identification code

— S903

Transmit an identity authentication request to the target device, the identity authentication request carrying the verification information

— S904

Perform data transmission processing for the user terminal and the target device in a case that the verification information is passed

1001
Processing module

1002
Communication module

Access processing device for remotely controlling a terminal

FIG. 16

ACCESS PROCESSING METHOD AND DEVICE FOR REMOTELY CONTROLLING TERMINAL AND STORAGE MEDIUM

CROSS-REFERENCE TO RELATED APPLICATION(S)

This application is a continuation application of International Application No. PCT/CN2021/108920, filed on Jul. 28, 2021, which claims priority to Chinese Patent Application No. 202110481961.9, filed with the China National Intellectual Property Administration on Apr. 30, 2021, the disclosures of each of which being incorporated by reference herein in their entireties.

FIELD

The disclosure relates to the technical field of computers, and in particular to an access processing method and device for remotely controlling a terminal, and a storage medium.

BACKGROUND

At present, with the continuous development of computer technologies, operation and maintenance users can remotely control other devices to realize inspection and maintenance of other devices. However, for the existing remote control, it is mainly that the operation and maintenance user inputs the information of a device needing to be connected (called a controlled device) in his own device, such as the user name and password of the controlled device. After the information is verified successfully by the controlled device, the operation and maintenance user can perform remote operation and maintenance on the controlled device by connecting his own device to the controlled device.

However, in the traditional remote control process, the user needs to find the Internet Protocol (IP) address and other information of the controlled device, and then input the account password, which is time-consuming, laborious, and relatively inefficient.

SUMMARY

Some embodiments provide an access processing method and device for remotely controlling a terminal, and a storage medium, which can efficiently realize the access processing of controlled devices.

Some embodiments provide an access processing method for remotely controlling a terminal, the method being executed by a management and control platform and including: obtaining identity information of a target user from a user terminal; returning a controllable device set corresponding to the target user to the user terminal based on the identity information, the controllable device set including: at least one device identifier, each device identifier in the controllable device set indicating a device configured for the target user by the management and control platform; receiving, from the user terminal, a target device identifier selected from the controllable device set, and obtaining verification information of a target device indicated by the target device identifier, the verification information comprising: access information for accessing the target device; and controlling the verification information to be transmitted to the target device to allow, based on verification of the verification information passing, access and remote control of the target device.

Some embodiments provide an access processing method for remotely controlling a terminal, the method being executed by a user terminal and including: scanning a pattern code based on a detected scanning operation, and obtaining the identity information of a target user after the scanning is successful, the pattern code being generated by the control device according to the identification code; transmitting the identity information to the management and control platform; receiving a controllable device set transmitted by the management and control platform, the controllable device set being obtained by the management and control platform based on the identity information; the controllable device set including: at least one device identifier, each device identifier in the controllable device set indicating a device configured for the target user by the management and control platform; transmitting the target device identifier to the management and control platform based on the selection operation of the target device identifier in the controllable device set.

Some embodiments provide an access processing method for remotely controlling a terminal, the method being executed by a control device and including: transmitting a remote control request to a proxy device based on a remote control instruction received on a command inputting interface, the remote control request instructing the proxy device to generate an identification code; receiving notification information transmitted by the proxy device, the notification information carrying the identification code; and generating a pattern code according to the identification code, and displaying the pattern code.

Some embodiments provide an access processing method for remotely controlling a terminal, the method being executed by a proxy device and including: generating an identification code for a control device based on a remote control request received from the control device; transmitting notification information carrying the identification code to the control device, the notification information triggering the control device to generate a pattern code according to the identification code and display the pattern code; obtaining verification information about a target device indicated by the target device identifier of a management and control platform according to the identification code, the verification information including: access information for accessing the target device; transmitting an identity authentication request to the target device, the identity authentication request carrying the verification information; and performing data transmission processing for the user terminal and the target device based on the verification for verification information being passed.

Some embodiments provide an access processing apparatus for remotely controlling a terminal, the apparatus including: at least one memory configured to store program code; and at least one processor configured to read the program code and operate as instructed by the program code, the program code comprising: a processing module, configured to obtain identity information of a target user from a user terminal; return a controllable device set corresponding to the target user to the user terminal based on the identity information, the controllable device set including: at least one device identifier, each device identifier in the controllable device set indicating a device configured for the target user by a management and control platform; a communication module, configured to receive, from the user terminal, a target device identifier selected from the controllable device set; the processing module, further configured to obtain verification information of a target device indicated by the target device identifier, the verification information including: access information for accessing the target device; the communication module, further configured to control the verification information to be transmitted to the target device to allow, based on verification of the verification information passing, access and remote control of the target device.

Some embodiments provide an access processing apparatus for remotely controlling a terminal, the apparatus including: at least one memory configured to store program code; and at least one processor configured to read the program code and operate as instructed by the program code, the program code comprising: a processing module, configured to scan a pattern code based on a detected scanning operation and obtain the identity information of a target user after the scanning is successful, the pattern code being generated by the control device according to the identification code; a communication module, configured to transmit the identity information to the management and control platform; receive a controllable device set transmitted by the management and control platform, the controllable device set being obtained by the management and control platform based on the identity information; the controllable device set including: at least one device identifier, each device identifier in the controllable device set indicating a device configured for the target user by the management and control platform; transmitting the target device identifier to the management and control platform based on the selection operation of the target device identifier in the controllable device set.

Some embodiments provide an access processing apparatus for remotely controlling a terminal, the apparatus including: at least one memory configured to store program code; and at least one processor configured to read the program code and operate as instructed by the program code, the program code comprising: a communication module, configured to transmit a remote control request to a proxy device based on a remote control instruction received on a command inputting interface, the remote control request instructing the proxy device to generate an identification code; receiving notification information transmitted by the proxy device, the notification information carrying the identification code; and a processing module, configured to generate a pattern code according to the identification code and display the pattern code.

Some embodiments provide an access processing apparatus for remotely controlling a terminal, the apparatus including: at least one memory configured to store program code; and at least one processor configured to read the program code and operate as instructed by the program code, the program code comprising: a processing module, configured to generate an identification code for a control device based on a remote control request received from the control device; a communication module, configured to transmit notification information carrying the identification code to the control device, the notification information triggering the control device to generate a pattern code according to the identification code and display the pattern code; the processing module, configured to obtain verification information about a target device indicated by the target device identifier of a management and control platform according to the identification code, the verification information including: access information for accessing the target device; the communication module, configured to transmit an identity authentication request to the target device, the identity authentication request carrying the verification information; and the processing module, configured to perform data transmission processing for the user terminal and the target device based on the verification for the verification information being passed.

Some embodiments provide an intelligent device, including: a memory and a processor; the memory being configured to store a computer program, and the processor being configured to execute the computer program to implement the above method.

Some embodiments provide a non-transitory computer-readable storage medium, storing computer code that when executed by at least one processor causes the at least one processor to implement the foregoing method embodiments.

Some embodiments provide a computer program product or a computer program, the computer program product or the computer program includes a computer instruction stored in the computer-readable storage medium. The processor of the intelligent device reads the computer instruction from the computer-readable storage medium and executes the computer instruction, so that the intelligent device executes the above method.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 11 is a schematic flowchart of an access processing method for remotely controlling a terminal according to some embodiments.

FIG. 12 is a schematic flowchart of an access processing method for remotely controlling a terminal according to some embodiments.

FIG. 15 is a schematic flowchart of an access processing method for remotely controlling a terminal according to some embodiments.

FIG. 16 is a schematic structural diagram of an access processing apparatus for remotely controlling a terminal according to some embodiments.

DESCRIPTION OF EMBODIMENTS

Figure 1:
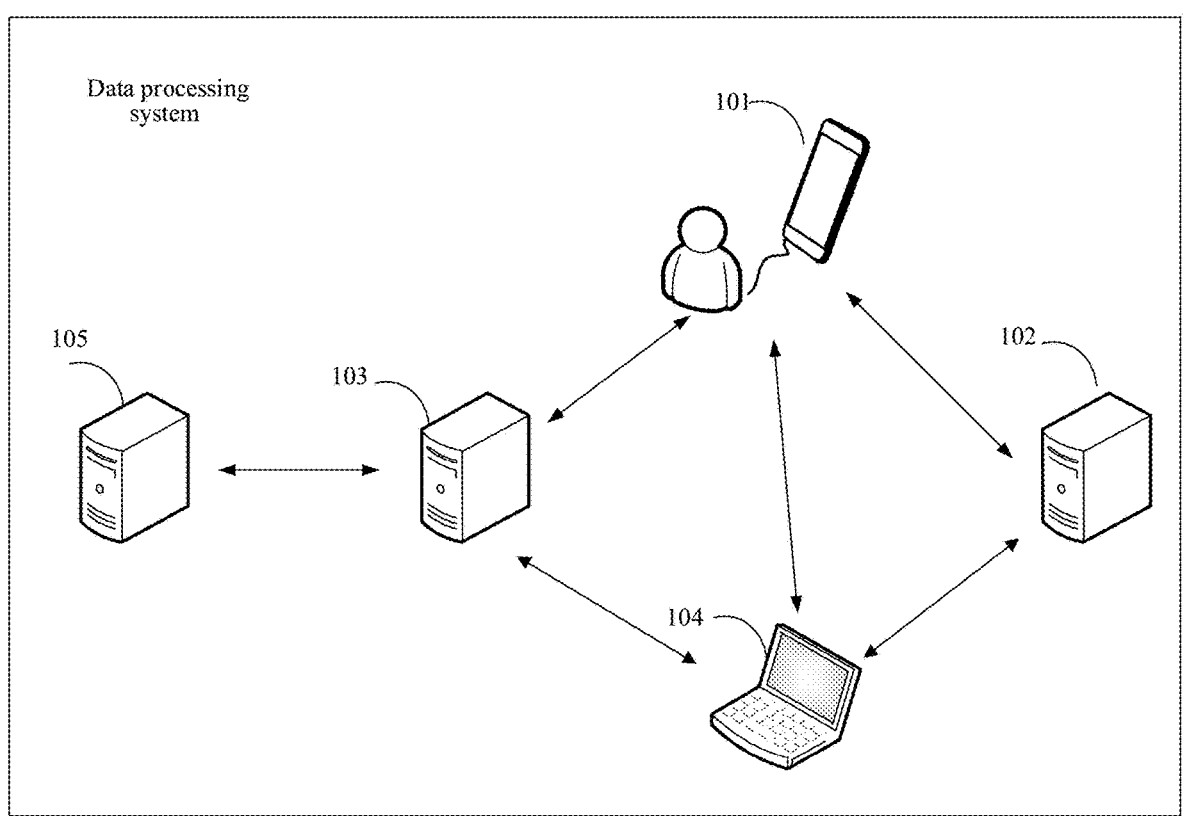
FIG. 1 is a schematic structural diagram of a data processing system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In some embodiments, a user obtains the identity information by scanning the pattern code and can confirm the identity of an operation and maintenance user who initiates the remote control through the obtained identity information, which better ensures that the normal operation and maintenance user initiates the remote control. On the other hand, the management and control platform configures a device which can be remotely controlled for the operation and maintenance user, and after the verification for the identity of the operation and maintenance personnel is passed, machines and devices that the operation and maintenance user is authorized to control can be directly viewed, thus realizing fine-grained access control and temporary access based on the identity; and as the identity of the operation and maintenance user is determined by scanning the pattern code instead of directly inputting the user name and password to start the connection, illegal users (or unauthorized users) can be better prevented from illegally (or impermissibly) controlling some machines and devices by violently testing the user name and password, the remote control on a target controlled device can be trigged more efficiently, and the security of remote control is ensured to a certain extent.

This disclosure provides a scheme for remotely controlling a device by scanning a code with a user terminal. According to some embodiments, a user is required to scan a pattern code through applications such as user account registration and an instant messaging application after login, so that the identity of an operation and maintenance user who initiates remote control can be confirmed through applications such as the instant messaging application, which better ensures that normal operation and maintenance users initiate remote control. According to some embodiments, a manager can configure a device that can be remotely controlled for the operation and maintenance user through pre-authorization on the management and control platform; when an operation and maintenance user needs to remotely control some machines and devices, the devices and machines that the operation and maintenance user is authorized to control can be directly viewed by means of list display, thus realizing fine-grained access control and temporary access based on identity; moreover, as the identity of the operation and maintenance user is determined by scanning the pattern code instead of directly inputting the user name and password to start the connection, unauthorized users can be better prevented from impermissibly controlling some machines and devices by violently testing the user name and password, and the security of remote control is also ensured to a certain extent.

In some embodiments, the corresponding applet or official account is called by scanning the pattern code (such as the two-dimensional code), the identity information of the operation and maintenance user is pulled, and after the verification for the identity information of the operation and maintenance user is passed, the device for which the operation and maintenance user has a remote control authority is displayed on the user terminal. In some embodiments, after the operation and maintenance user selects a device that can be remotely controlled by the operation and maintenance user, the verification information of the device can be obtained and is transmitted to the proxy device, so that the proxy device can establish a connection with a target device based on the verification information to realize the remote control on the device by the user terminal. By displaying the device with a remote control authority, it is convenient for the operation and maintenance user to select the device which needs to be controlled conveniently and quickly, and there is no need for the operation and maintenance user to search information such as an IP address of the controlled device. In the process of realizing remote control, the problems of being mined and extorted caused by blasting attacks of unauthorized users such as hackers, and the easy loss and forgetting of passwords in the distribution process can be well prevented by a proxy device and a pattern code, and thus, the safety of remote control on the device can be well guaranteed. In some embodiments, when data transmission is controlled remotely, a proxy device can also be used for auditing transmitted data, so as to facilitate subsequent management of user playback, traceability and the like.

In some embodiments, the cloud security in Cloud technology can be used for managing and verifying the identity of the operation and maintenance user and establishing the remote control connection between devices after the identity verification is successful. In this way, the problems of being mined and extorted caused by blasting attacks of unauthorized users such as hackers, and the easy loss and forgetting of passwords in the distribution process can be well prevented, and thus, the safety of remote control on the device can be well guaranteed. The so-called Cloud technology refers to a hosting technology that unifies a series of resources such as hardware, software and network in a wide area network or a local area network to realize calculation, storage, processing and sharing of data. The Cloud technology is the generic term of network technology, information technology, integration technology, management platform technology and application technology based on cloud computing business model applications, and can form a resource pool, is used on demand, and is flexible and convenient. A cloud computing technology will become an important support. The background service of a technical network system needs a lot of computing and storage resources, such as video websites, photo websites and more portal websites. With the high development and application of the Internet industry, every item may have its own identification mark in the future, which needs to be transmitted to a background system for logical processing. Different levels of data will be processed separately, and all kinds of industry data need strong system backing support, which can only be realized through cloud computing.

Cloud Security refers to the general name of security software, hardware, users, institutions and secure cloud platforms based on cloud computing business model applications. Cloud security integrates emerging technologies and concepts such as parallel processing, grid computing, and unknown virus behavior judgment. Through the abnormal monitoring of software behaviors in the network by a large number of mesh clients, the latest information of Trojans and malicious programs in the Internet is obtained and transmitted to a server for automatic analysis and processing, and then the solutions of viruses and Trojans are distributed to each client. The main research directions of cloud security include: 1. Cloud computing security mainly studies how to ensure the security of the cloud itself and various applications on the cloud, including the security of a cloud computer system, safe storage and isolation of user data, user access authentication, information transmission security, network attack protection, compliance audit, etc. 2. The cloudization of security infrastructure mainly studies how to use cloud computing to create and integrate security infrastructure resources and optimize a security protection mechanism, including constructing a platform for collecting and processing large-scale security incidents and information through a cloud computing technology, realizing the collection and correlation analysis of massive information, and improving the security incident control ability and risk control ability of the whole network; 3. Cloud security services mainly study various security services provided to users based on cloud computing platforms, such as anti-virus services.

Based on the above cloud security technology, some embodiments provide a data processing system, in which access processing, control processing, data exchange and other processing for remote control of some controlled devices can be performed. FIG. 1 shows a schematic structural diagram of a data processing system according to some embodiments. The data processing system may include: at least one user terminal 101, a management and control platform 102, a proxy device 103, a control device 104 and at least one controllable device 105 (i.e., a target device). Various applications run on the user terminal 101, for example, the application may be an instant messaging application. The user terminal 101 may be a terminal with a scanning function, for example, the user terminal 101 may be a smart phone, a tablet computer, a notebook computer, a desktop computer, etc. The management and control platform 102 may be an identity management platform for identity management. The identity management can include account management, identity authentication management, authorization management and the like.

The control device 104 can be a tablet computer, a notebook computer, a desktop computer, etc. The proxy device 103 and the controllable device 105 may be terminals as shown in the user terminal 101 or servers. When the proxy device 103 and the controllable device 105 are servers, the server may be an independent physical server, may also be a server cluster composed of multiple physical servers or a distributed system, and may further be a cloud server that provides cloud services, cloud databases, cloud computing, cloud functions, cloud storage, network services, cloud communication, middleware services, domain name services, security services, content delivery network (CDN), big data and artificial intelligence. The user terminal 101, the management and control platform 102, the proxy device 103, the control device 104 and the controllable device 105 can be directly or indirectly connected by wired or wireless communication.

In some embodiments, the user terminal 101 can obtain the identity information of an operation and maintenance user by scanning the pattern code (such as a two-dimensional code) of the control device 104 and transmits the identity information to the management and control platform 102. The management and control platform 102 can query a controllable device set corresponding to a user according to the identity information, and transmits the controllable device set to the user terminal 101, so that the operation and maintenance user can select a device (i.e. a controllable device 105) that needs to be remotely controlled from the controllable device set.

In some embodiments, the user terminal 101 transmits the device identifier of the controllable device 105 to the management and control platform 102. The management and control platform 102 can obtain the verification information of the controllable device 105 indicated by the device identifier and transmit the verification information to the proxy device 103, so that the proxy device 103 can initiate an authentication request to the controllable device 105, and after the authentication request is passed, the proxy device 103 can perform data transmission processing for the user terminal 101 and the controllable device 105.

Figure 2:
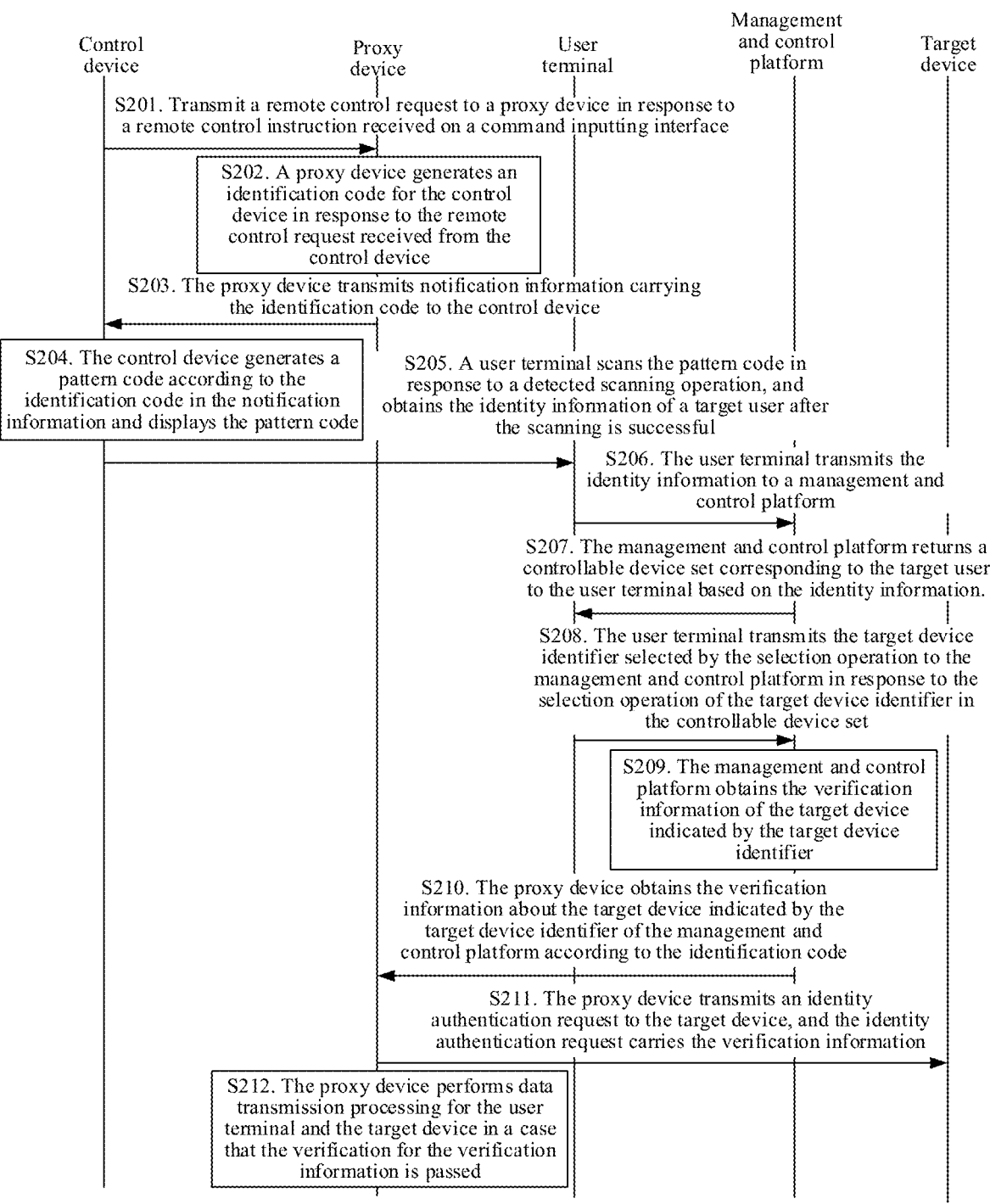
FIG. 2 is a schematic flowchart of an access processing method for remotely controlling a terminal according to some embodiments.

Based on the data processing system provided above, some embodiments provide an access processing method for remotely controlling a terminal. The method described in the foregoing embodiments can be realized through interaction among different intelligent devices, such as information interaction among the user terminal 101, the management and control platform 102, the proxy device 103, the control device 104 and the controllable device 105 in FIG. 1. FIG. 2 shows a schematic flowchart of an access processing method for remotely controlling a terminal according to some embodiments, the method may include the following operations:

S201: A control device transmits a remote control request to a proxy device based on a remote control instruction received on a command inputting interface. The remote control request instructing the proxy device to generate an identification code.

In some embodiments, when an operation and maintenance user (that is, a target user) wants to remotely control a certain device, remote control instructions can be inputted in a command inputting interface provided by the control device. For example, the operation and maintenance personnel can input the remote control instructions in the command inputting interface, such as some designated instructions "ssh cfw.tencentcs.com:2222". Then the control device generates a remote control request based on the received remote control instructions, and transmits the remote control request to the proxy device.

S202: A proxy device generates an identification code for the control device based on the remote control request received from the control device. The identification code can be a universally unique identifier (uuid).

In some embodiments, after responding to the received remote control request, the proxy device may randomly generate an identification code for the control device or generate an identification code in a certain way, for example, the identification code may be generated in a way of numbers plus special symbols. A generation mode of the identification code is not limited herein.

S203: The proxy device transmits notification information carrying the identification code to the control device. The notification information is used for triggering the control device to generate a pattern code according to the identification code and display the pattern code. The pattern code can be a bar code, a two-dimensional code, etc.

S204: The control device generates a pattern code according to the identification code in the notification information and displays the pattern code. The control device receives the notification information carrying the identification code transmitted by the proxy device, then obtains the identification code in the notification information, and processes the identification code according to pattern code generation rules to generate the pattern code.

S205: A user terminal scans the pattern code based on a detected scanning operation, and obtains the identity information of a target user after the scanning is successful. The identity information refers to the information that can uniquely identify the identity of the target user, that is, the identity information needs to be unique and tamper-proof, thereby preventing the identity from being forged and tampered with; then according to the identity information, the identity of the target user can be guaranteed to be legal. In this case, the identity information may include at least one of the following: a user identity identifier and an instant messaging user identifier, and the user identify identifier can be a user ID number, a mobile phone number, etc.

In some embodiments, the scanning operation can be an operation of triggering a scanning tool. The scanning tool can be a scanning tool that comes with the user terminal, or the scanning tool can be a scanning tool in an instant messaging application, and the operation of triggering the scanning tool can be an operation of clicking the scanning tool. When the operation and maintenance user triggers the scanning tool that comes with the user terminal, the user terminal directly scans the pattern code displayed on the control device based on a detected scanning operation, and can directly pull the identity information of the target user after scanning the pattern code successfully. At this time, the identity information may include the user identity identifier. When the operation and maintenance user triggers the scanning tool in the instant messaging application, as various applets run in the instant messaging application, the user terminal scans the pattern code on the control device based on the detected scanning operation. After the scanning is successful, the user terminal can jump from the instant messaging application to the applet in the instant messaging application to obtain the identity information of the target user from the applet.

The identity information may include the user identity identifier and an instant messaging user identifier.

In some embodiments, before the user terminal responds to the detected scanning operation, the control device can also transmit the pattern code to the user terminal. In some embodiments, the scanning operation can also be an operation of long pressing the pattern code or an operation of sliding the pattern code. In some embodiments, the user terminal automatically scans and identifies the pattern code on the user terminal based on the detected scanning operation, and can also obtain the identity information of the target user after the scanning is successful.

When the scanning operation is the operation of long pressing the pattern code or the operation of sliding the pattern code, the identity information can also be obtained by long pressing the pattern code or sliding the pattern code in the user terminal and long pressing the pattern code or sliding the pattern code in the instant messaging application of the user terminal, which is not repeated herein.

S206: The user terminal transmits the identity information to the management and control platform. When the user terminal jumps from the instant messaging application to the applet in the instant messaging application, at this time, operation S206 may be that the applet transmits the identity information to the management and control platform.

S207: The management and control platform returns a controllable device set corresponding to the target user to the user terminal based on the identity information. The controllable device set includes: at least one device identifier. Each device identifier in the controllable device set is used for indicating a device configured for the target user by the management and control platform. The target user has a remote control authority for the device indicated by the device identifier in the controllable device set.

The management and control platform receives the identity information of the target user transmitted by operation S206, and searches the controllable device set corresponding to the target user based on the identity information after receiving the identity information of the target user. In some embodiments, the identity information received by the management and control platform includes a user identity identifier and an instant messaging user identifier. The management and control platform can determine whether the identity information meets a verification condition. The verification condition may refer that before the applet is used for obtaining the identity information or the user identity identifier for the first time, the user identity or the user identity identifier has been associated with the controllable device set. In this case, after determining that the identity information meets the verification condition, the management and control platform can search the controllable device set corresponding to the target user according to the user identity identifier.

In some embodiments, the management and control platform responds that the identity information meets the verification condition and matches the user identity identifier with a reference user identity identifier. If there is a reference user identity identifier matching the user identity identifier, the controllable device set corresponding to the matched reference user identity identifier can be obtained as the controllable device set corresponding to the target user. That is, the management and control platform successfully searches out the controllable device set corresponding to the target user, and returns the searched-out controllable device set corresponding to the target user to the user terminal. In some embodiments, the management and control platform associates the instant messaging user identifier with the controllable device set, so that subsequently, the controllable device set corresponding to the target user can also be searched according to the instant messaging user identifier.

It can be understood that as the user identify identifier has been associated with the controllable device set in previous configuration, the management and control platform can also associatively store the instant messaging user identifier and the user identify identifier in local space, and also achieve the purpose of associating the instant messaging user identifier with the controllable device set.

In some embodiments, after receiving the identity information including the instant messaging user identifier of the target user transmitted by the user terminal, the management and control platform determines whether the identity information meets a device obtaining condition. The device obtaining condition may be the second or multiple use of the applet to obtain the identity information, or the instant messaging user identifier has been associated with the controllable device set during configuration. In this case, after determining that the identity information meets the device obtaining condition, the management and control platform can search the controllable device set corresponding to the target user according to the instant messaging user identifier. In some embodiments, the management and control platform responds that the identity information meets the device obtaining condition, and directly searches the controllable device set corresponding to the target user according to the instant messaging user identifier. Based on the controllable device set corresponding to the target user is searched out, the searched-out controllable device set corresponding to the target user is returned to the user terminal.

Figure 3:
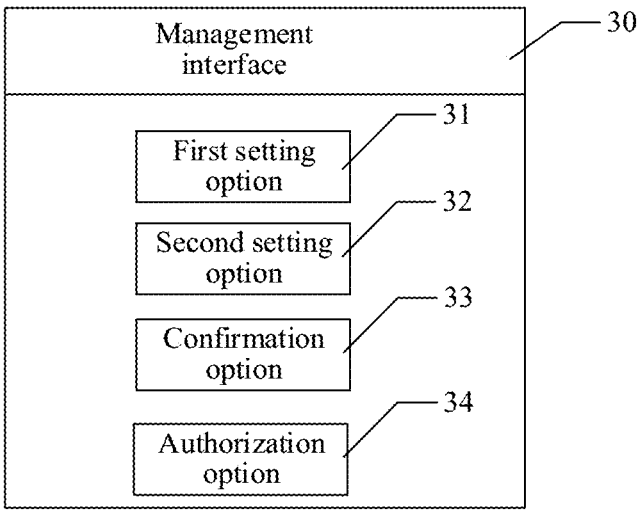
FIG. 3 is a schematic diagram of a management interface according to some embodiments.

Before executing operation S207, some embodiments may provide a management interface, in which a management user can authorize the device for each operation and maintenance user (including the target user) to obtain the controllable device set corresponding to each operation and maintenance user, thereby realizing the pre-authorization of the operation and maintenance user. In some embodiments, the management user can trigger a first configuration operation. The triggering a first configuration operation can be an operation of clicking a first configuration key in the management and control platform, or an operation triggered by a specific gesture, which can be an "OK" gesture, an "M" gesture, and the like. The management and control platform displays the management interface based on the first configuration operation. The management interface 30 can be as shown in FIG. 3. The management interface 30 includes a first setting option 31 and a second setting option 32. The management and control platform can set the reference identity information of the operation and maintenance user through the first setting option, and can set a controllable device set with a remote control authority for the reference identity information set in the first setting option through the second setting option. The management interface provided in FIG. 3 of some embodiments only shows the positional relationship between the first setting option and the second setting option by way of example. In actual process, the positions of the first setting option and the second setting option in the management interface can be set according to requirements, for example, the positional relationship between the first setting option and the second setting option can be arranged side by side. As another example, the positional relationship between the first setting option and the second setting option may be that the second setting option is arranged behind the first setting option.

Figure 4:
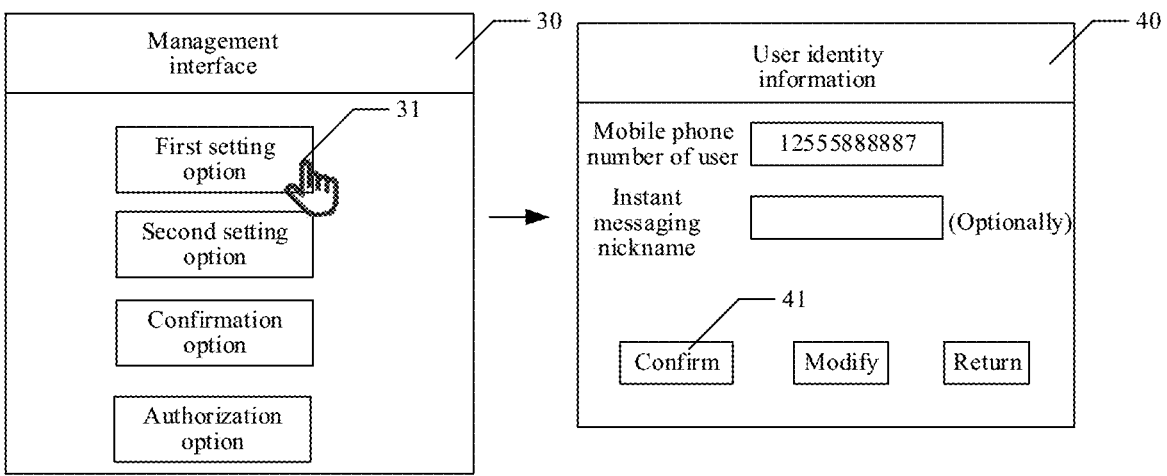
FIG. 4 is a schematic diagram of a reference user identity information configuration according to some embodiments.
Figures 5, 6:
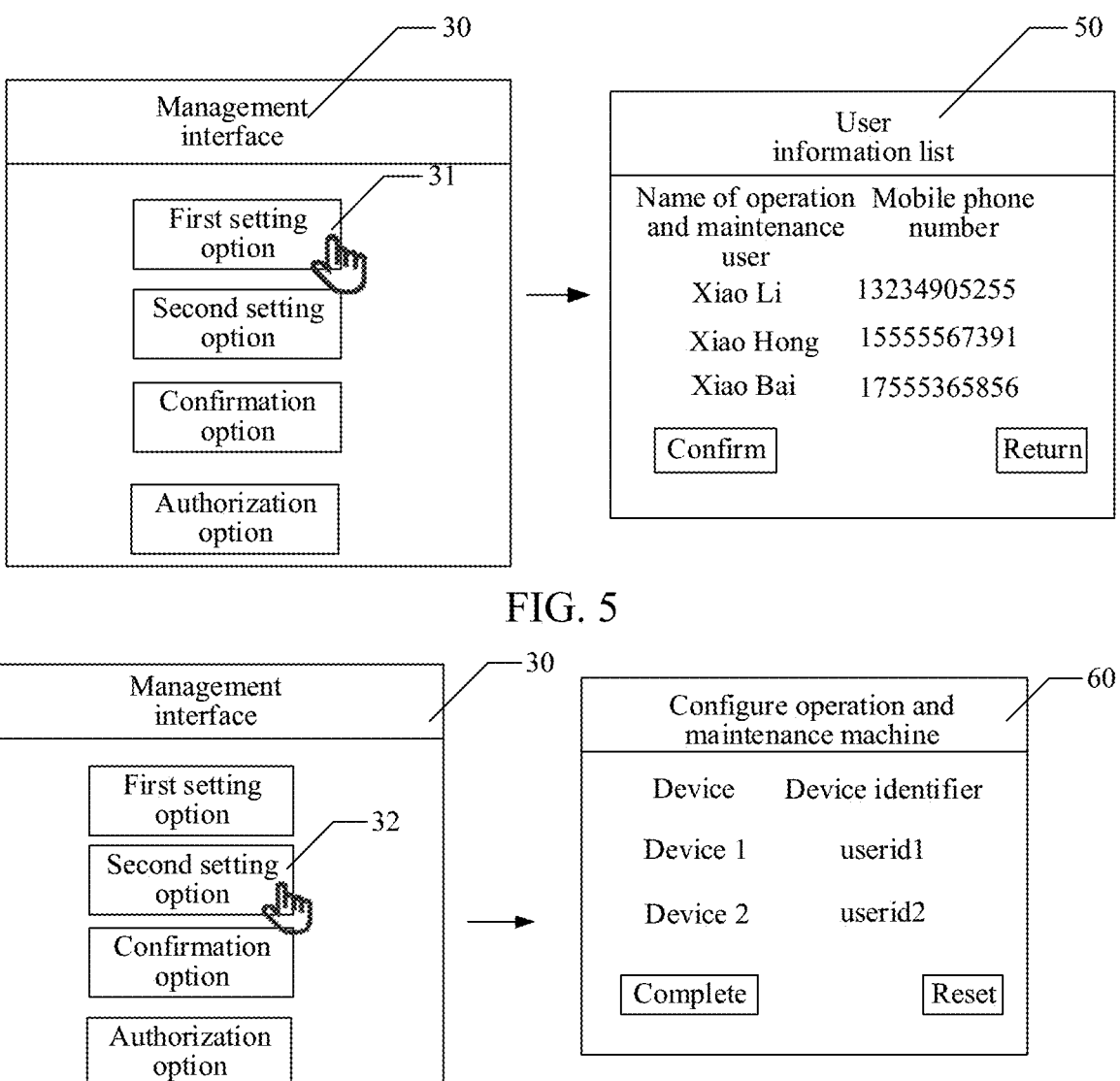
FIG. 5 is a schematic diagram of a reference user identity information configuration according to some embodiments.
FIG. 6 is a schematic diagram of a controllable device set configuration according to some embodiments.

When the management user selects the first setting option, the management and control platform can display the first setting interface based on the selection operation of the first setting option, and the management user can fill in the reference identity information of the user who has completed the operation and maintenance in the first setting interface. In some embodiments, reference identity information of multiple operation and maintenance users is displayed in the first setting interface. The reference identity information may include at least one of the following: user identity identifiers and instant messaging user identifiers of the operation and maintenance users. The management user only needs to select the reference identity information of the corresponding operation and maintenance user from the reference identity information of the multiple operation and maintenance users. For example, after the management user clicks the first setting option 31 in the management interface 30, the management and control platform displays the first setting interface 40 as shown in FIG. 4 based on the clicking operation of the first setting option 31. In the first setting interface 40, the management user can fill in the reference identity information. In FIG. 4, the management user can fill in the user mobile phone number "12555888887" of the operation and maintenance personnel. In some embodiments, the management user can also fill in the instant messaging nickname of the operation and maintenance user, etc. When the management user clicks a confirmation key 41 of the first setting interface 40, the management and control platform generates the reference identity information of the operation and maintenance personnel based on the clicking operation of the confirmation key 41. In some embodiments, after the management user clicks the first setting option 31 in the management interface 30, the management and control platform displays a first setting interface 50 as shown in FIG. 5. The first setting interface 50 displays multiple operation and maintenance users (such as Xiao Li, Xiao Hong and Xiao Bai in FIG. 5) and the mobile phone number of each operation and maintenance user (for example, the mobile phone number 13234905255 of Xiao Li, the mobile phone number 15555567391 of Xiao Hong, and the mobile phone number 17555365856 of Xiao Bai in FIG. 5). Then the management user selects the mobile phone number 13234905255 of Xiao Li as the reference identity information of Xiao Li from the mobile phone numbers of the multiple operation and maintenance users.

Figures 7, 8:
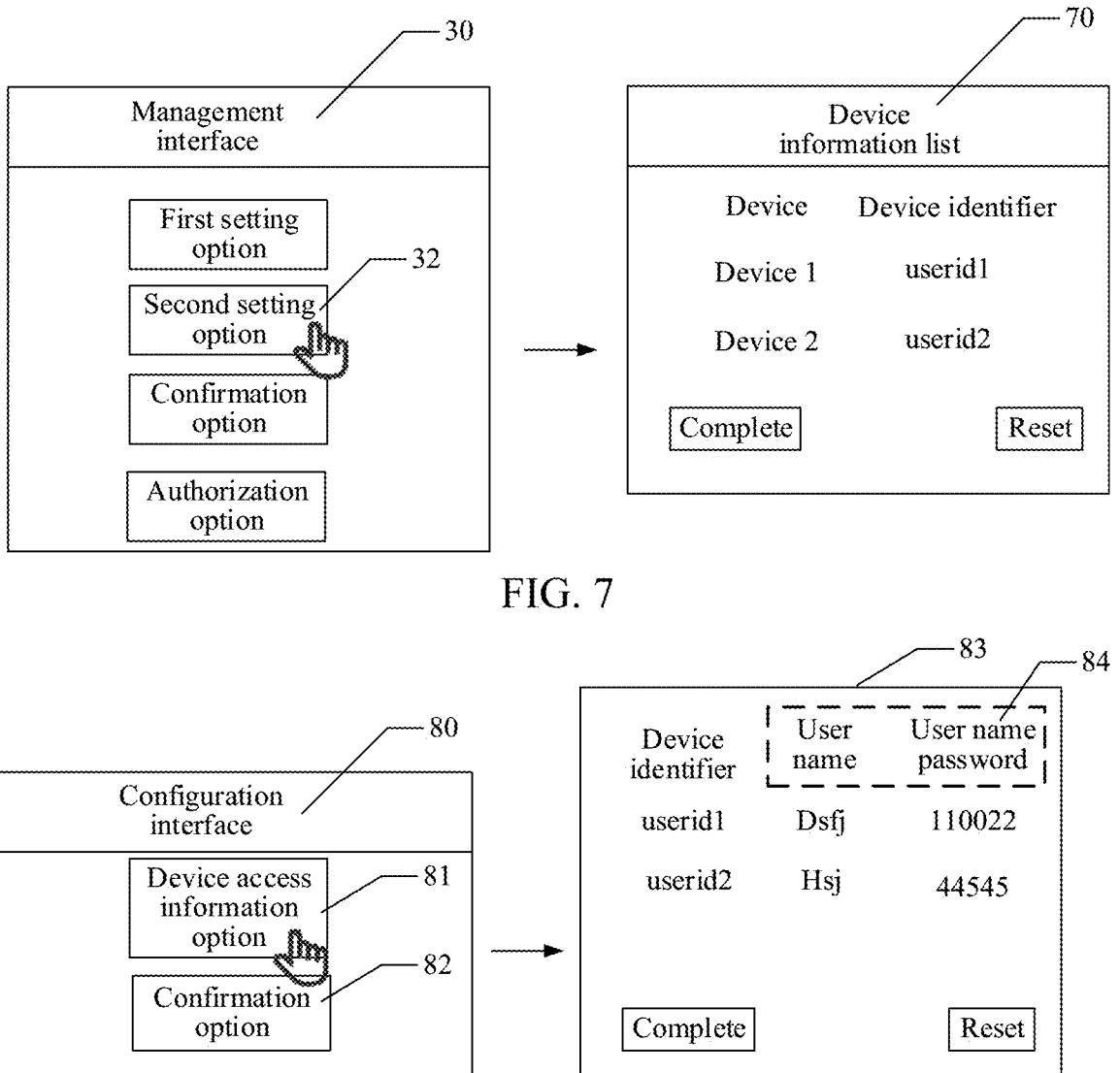
FIG. 7 is a schematic diagram of a controllable device set configuration according to some embodiments.
FIG. 8 is a schematic diagram of an access information configuration of a remote access device according to some embodiments.

When the management user selects the second setting option, the management and control platform displays a second setting interface based on the triggering operation of the second setting option, and the management user configures a device for which the operation and maintenance user has a remote control authority and a device identifier corresponding to the device in the second setting interface. Or a device information list is displayed in the second setting interface, and each device in the device information list corresponds to one device identifier. The management user only needs to select device identifiers from the device information list to form a controllable device set. For example, after the management user clicks the second setting option 32 in the management interface 30, the management and control platform displays a second setting interface 60 as shown in FIG. 6. In the second setting interface 60, the management user sets a device with a remote control authority for the operation and maintenance user and a device identifier corresponding to the device. In FIG. 6, a device with a remote control authority configured by the management and control platform for the operation and maintenance user includes a device 1 and a device 2; a device identifier corresponding to the device 1 is "userid1"; and a device identifier corresponding to the device 2 is "userid2". That is, the device identifier corresponding to the device 1 and the device identifier corresponding to the device 2 form a controllable device set. In some embodiments, after the management user clicks the second setting option 32 in the management interface 30, the management and control platform displays a second setting interface 70 as shown in FIG. 7. The second setting interface 70 displays a device information list. The device information list includes information of two devices, for example, a device 1 and a device 2 in FIG. 7. A device identifier corresponding to the device 1 is "userid1"; and a device identifier corresponding to the device 2 is "userid2". When the management user selects the device 1 in the device information list, the management and control platform can add the device identifier "userid1" corresponding to the device 1 to the controllable device set.

In some embodiments, the management interface 30 may also include a confirmation option 33, as shown in FIG. 3. After the management and control platform completes the setting of the reference identity information of the operation and maintenance user through the first setting option and completes the setting of the controllable device set through the second setting option, the management user can trigger the confirmation option. In some embodiments, the management and control platform can associate the reference identity information being set by the first setting option with the controllable device set being set by the second setting option based on the triggering operation of the confirmation option; and the reference identity information and the controllable device set are stored in the local space of the management and control platform. In some embodiments, the management and control platform associates the reference identity information being set by the first setting option with the controllable device set being set by the second setting option based on the triggering operation of the confirmation option, and then transmits the associated reference identity information and controllable device set to any node in a block chain network; and any node verifies the associated reference identity information and the controllable device set, generates a block with the associated reference identity information and controllable device set after verification is passed, and transmits the block to other nodes in the block chain network for consensus. When the consensus is successful, the block is saved in the block chain network, thus preventing the associated reference identity information and controllable device set from being tampered with. The block chain network here is a new application mode of distributed data storage, point-to-point transmission, a consensus mechanism, an encryption algorithm and other computer technologies. Essentially, the block chain network is a decentralized database, which is a series of data blocks associated by cryptography method.

In some embodiments, as shown in FIG. 3, the management interface 30 may further include an authorization option 34. The management and control platform generates an identity verification request message based on the triggering operation of the authorization option, and transmits the identity verification request message to the reference user terminal corresponding to the reference identity information set in the first setting option, so that the reference user terminal can perform authorization processing based on the identity verification request message; and the management and control platform associates the reference identity information with the controllable device set based on the received authorization passed message fed back by the reference user terminal.

The identity verification request message can be transmitted to the reference user terminal in the form of a two-dimensional code, a bar code, etc. The identity verification request may be transmitted to the reference user terminal in the form of a card; The reference user terminal may be the above user terminal or other terminals. In some embodiments, the management user can trigger the authorization option in the management interface after completing the setting of the reference identity information of the operation and maintenance user through the first setting option, or completing the setting of the reference identity information of the operation and maintenance user through the first setting option and completing the setting of the controllable device set through the second setting option. The management and control platform generates an identity verification request message based on the triggering operation of the authorization option, and transmits the identity verification request message to a reference user terminal corresponding to the reference identity information set in the first setting option; the reference user terminal can perform authorization processing based on the identity verification request message; and authorization here can be understood as that the operation and maintenance personnel performs registration by the reference user terminal. When the reference user terminal determines the authorization according to the identity verification request message, that is, the operation and maintenance personnel completes the registration through the reference user terminal, the reference user terminal can transmit an authorization passed message to the management and control platform, and then the management and control platform receives the authorization passed message fed back by the reference user terminal, and can associate the reference identity information with the controllable device set based on the received authorization passed message.

When the reference user terminal determines the authorization according to the identity verification request message, if the authorization is performed on the instant messaging application of the reference user terminal at this time and the reference identity information does not include an instant messaging user identifier therein, the authorization passed message can also carry the instant messaging user identifier therein, and the management and control platform can respond to the received authorization passed message fed back by the reference user terminal, that is, adds the instant messaging user identifier to the reference identity information, and associates the added reference identity information with the controllable device set.

S208: The user terminal transmits the target device identifier selected by the selection operation to the management and control platform based on the selection operation of the target device identifier in the controllable device set.

In some embodiments, after operation S207, the user terminal may receive the controllable device set returned by the management and control platform and corresponding to the target user, and the controllable device set is displayed on the user terminal. The operation and maintenance user can select the device identifier (target device identifier) that needs to be remotely controlled from the displayed controllable device set. The user terminal transmits the target device identifier to the management and control platform based on the selection operation of the target device identifier in the controllable device set, so that the management and control platform can obtain the verification information of the target device indicated by the target device identifier The selection operation can be an operation of clicking the target device identifier in the controllable device set. Or the selection operation may be an operation of sliding the target device identifier in the controllable device set, for example, an operation of sliding the target device identifier in the controllable device set towards the right or towards the left.

S209: The management and control platform obtains the verification information of the target device indicated by the target device identifier.

The verification information may include one or more of the following: access information for accessing the target device and address information of the target device indicated by the target device identifier. The access information may include a user name and a user name password.

In some embodiments, the management and control platform can search a device identifier matching with the target device identifier from multiple device identifiers stored in the local space, or the management and control platform queries the device identifier matching with the target device identifier from the block chain network; then, after the device identifier matched with the target device identifier is successfully searched out, the verification information corresponding to the matched device identifier is obtained as the verification information of the target device indicated by the target device identifier; and then the management and control platform transmits the verification information of the target device to the proxy device, so that the proxy device establishes data transmission connection with the target device according to the verification information of the target device.

In some embodiments, before operation S209 is executed, or after the management and control platform generates the controllable device set, the management and control platform can set the verification information corresponding to the device identifier in the controllable device set. In some embodiments, the second setting interface includes the verification information option; and after the operation and maintenance personnel triggers the verification information option and fills in the verification information of the device indicated by each device identifier, the management and control platform can save the verification information of the device indicated by each device identifier in the local space or upload the verification information to the block chain network based on the triggering operation of the verification information option.

In some embodiments, the verification information includes the access information required for remotely accessing the device, and the management and control platform can also obtain the verification information of the target device indicated by the target device identifier in the controllable device set from the user terminal. In some embodiments, the operation and management user can trigger a second configuration operation. The triggering a second configuration operation can be an operation of clicking a second configuration key in the user terminal, or the triggering a second configuration operation may be an operation triggered by a specific gesture, which can be an "OK" gesture, an "M" gesture, and the like. The user terminal displays a configuration interface based on a second configuration operation; the configuration interface includes a device access information option, or the configuration interface includes a device access information option and a confirmation option; the device access information option is used for inputting access information required for remotely accessing the device; that is, when the target user triggers the device access information option, the user terminal can display an information inputting interface based on the triggering operation of the device access information option; and in the device access information option, the target user can input the access information of the target device indicated by the target device identifier. In some embodiments, the information inputting interface also includes a completion option. If the target user triggers the completion option, the user terminal returns to the configuration interface based on the triggering operation of the completion option. It is to be understood that every operation and maintenance personnel can input the access information of the device that needs to be remotely controlled through a device access information option every time, when the operation and maintenance personnel remotely controls a certain device.

For example, the configuration interface 80 is shown in FIG. 8, the configuration interface 80 includes a device access information option 81 and a confirmation option 82. When the operation and maintenance personnel clicks the device access information option 81, the user terminal can display an information inputting interface 83 based on the device access information option 81, and configure access information 84 in the information inputting interface 83. For example, the operation and maintenance personnel configures the access information of the device indicated by the device identifier userid1 as "Dsfj, 110022" and the access information of the device indicated by the device identifier userid2 as "Hsj, 44545".

In order to reduce the problem that the operation and maintenance personnel needs to input the access information of the access device every time, when the operation and maintenance personnel remotely accesses the device, the way of remembering the access information can be adopted. The operation and maintenance personnel inputs the access information corresponding to each device identifier in the controllable device set through the information inputting interface, and triggers the confirmation option; the confirmation option is used for receiving the confirmation operation; when the user terminal receives the confirmation operation on the confirmation option, the user terminal can transmit a recording request to the management and control platform to request the management and control platform to store the access information of the device indicated by each device identifier. When the operation and maintenance personnel logs in a certain device, the management and control platform directly obtains the access information corresponding to the device indicated by the device identifier according to the device identifier, and the operation and maintenance personnel does not need to input the access information corresponding to the device identifier again through the user terminal, thus improving the remote control efficiency.

S210: The proxy device obtains the verification information about the target device indicated by the target device identifier of the management and control platform according to the identification code.

In some embodiments, after operation S209 is executed, the management and control platform transmits the verification information of the target device indicated by the target device identifier to a proxy platform, the identification code is also carried in the process of transmitting the verification information of the target device indicated by the target device identifier, and then the verification information of the target device indicated by the target device identifier is obtained according to the identification code.

The management and control platform can transmit the verification information of the target device indicated by the target device identifier to the proxy device in the following ways. The verification information includes the address information of the target device indicated by the target device identifier; the management and control platform transmits the verification information to the proxy device based on a secure shell protocol (SSH); and the verification information is used for triggering the proxy device to transmit an SSH authentication request to the target device corresponding to the address information through a public network SSH server.

S211: The proxy device transmits an identity authentication request to the target device, and the identity authentication request carries the verification information. The target device is any device in the public network.

In some embodiments, a firewall and a secure group policy can be used for converging all devices in the public network, and a proxy device is provided as an entrance to any device in the public network, which can be understood as follows: during remote connection, the proxy device is required to transmit data with any device in the public network, and in the process of data transmission, data is forwarded through the proxy device.

In some embodiments, the proxy device can receive the verification information transmitted by the management and control platform based on the SSH protocol, and then transmits an SSH authentication request (i.e., an identity authentication request) to the target device corresponding to the address information through the public network SSH server; and the SSH authentication request carries the verification information therein. The SSH protocol refers to the security protocol based on an application layer, which can be used for providing security for remote login sessions and other network services, and can prevent information leakage in the process of remote management.

S212: The proxy device performs data transmission processing for the user terminal and the target device based on the verification for verification information being passed. The data transmission between the user terminal and the target device may include: control data of the user terminal to the target device, or target response data fed back to the user terminal by the target device, or control data of the user terminal to the target device and target response data fed back to the user terminal by the target device.

In some embodiments, the target device can verify the verification information in response to the received identity verification request. When the verification for the verification information by the target device is passed, a verification passed message is transmitted to the proxy device. The proxy device can establish a communication connection with the target device based on the received verification passed message; and the proxy device also establishes a communication connection with the user terminal. That is to say, the communication connection established for the user terminal and the target device by the proxy device performs data transmission processing for the user terminal and the target device.

The process that the proxy device performs data transmission processing for the user terminal and the target device is as follows: the user terminal transmits control data to the target device, the proxy device first receives the control data transmitted by the user terminal, and the control data includes a task identifier; then the proxy device transmits the control data to the target device remotely controlled by the user terminal based on the task identifier; then, after receiving the control data transmitted by the proxy device, the target device feeds back the target response data to the user terminal based on the control data; and then the proxy device receives the target response data fed back by the target device to the user terminal, and forwards the target response data to the user terminal.

In some embodiments, the management and control platform configures the device with a remote control authority for the target user, which can realize fine-grained access control and temporary access control based on the identity. The user terminal can obtain the identity information of the target user by scanning the pattern code and transmit the identity information to the management and control platform. The management and control platform verifies the identity information and returns the controllable device set corresponding to the target user to the user terminal after the verification is passed; and then the management and control platform receives the target device identifier, obtains the verification information of the target device indicated by the target device identifier, and transmits the verification information of the device to the proxy device, so that the proxy device can realize remote control with the device according to the verification information, and the remote control on a target controlled device can be triggered more efficiently. In the process of realizing the remote control, the problems of being mined and extorted caused by blasting attacks of unauthorized users such as hackers, and the easy loss and forgetting of passwords in the distribution process can be well prevented by using the pattern code and the proxy device; and thus, the safety of remote control on the device is guaranteed. When data transmission is controlled remotely, the proxy device can also be used for auditing transmitted data, so as to facilitate subsequent management of user playback, traceability and the like.

Figures 9, 10:
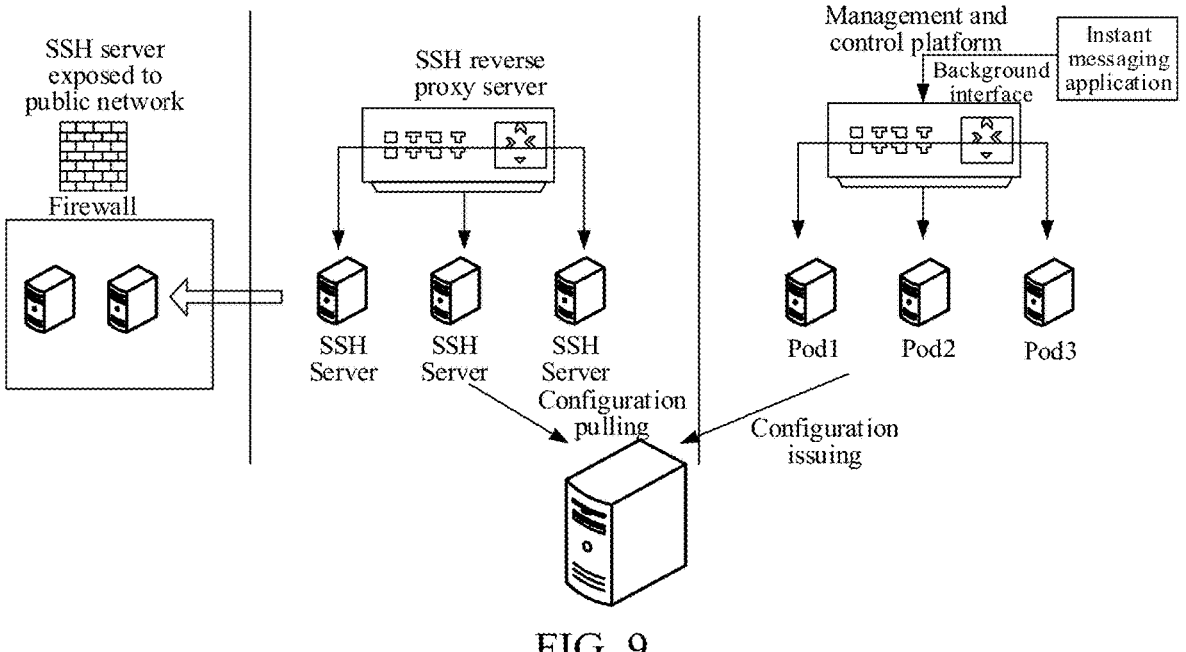
FIG. 9 is a schematic diagram of a data processing system according to some embodiments.
FIG. 10 is a schematic flowchart of an access processing method for remotely controlling a terminal according to some embodiments.

The access processing method for remotely controlling the terminal provided by some embodiments can be applied to scenes of remote control on various devices. For example, taking the remote control the SSH server as an example, some embodiments provide a more specific data processing system. As shown in FIG. 9, the data processing system includes an SSH reverse proxy server, an SSH server in public network (i.e. a target device), a management and control platform and an SSH terminal (i.e. a user terminal). In some embodiments, the SSH server exposed in the public network is converged by using a cloud firewall, the SSH reverse proxy server is used as the entrance to access the SSH server in the public network, and the management and control platform is connected to an instant messaging application in the user terminal by using a background interface. Based on the data processing system shown in FIG. 9, reference is made to the access processing method for remotely controlling the terminal shown in FIG. 10. The access processing method for remotely controlling the terminal mainly includes two major operations: (1) the management and control platform configures a controllable device set with a remote control authority for the operation and maintenance personnel. (2) the management and control platform obtains the controllable device set for which the operation and maintenance personnel has a remote control authority according to the identity information of the operation and maintenance personnel, and when the operation and maintenance personnel selects a device to be remotely controlled device from the controllable device set, the user terminal remotely controls the device selected by the operation and maintenance personnel through the proxy device.

(1) The specific process of the management and control platform configuring a controllable device set with a remote control authority for the operation and maintenance personnel is as follows:

1. The mobile phone number (that is, the above-mentioned reference identity information) of the operation and maintenance personnel who needs to remotely access the SSH service is added to the management interface provided by the management and control platform.

2. After completing the configuration of the mobile phone number of the operation and maintenance personnel for the operation and maintenance personnel, the management and control platform transmits instant messaging application authorization information (i.e. the above-mentioned identity verification request message) to the applet in instant messaging software of the user terminal, so that the operation and maintenance personnel performs registration based on the instant messaging application authorization information; the instant messaging application authorization information can be transmitted to the applet in the instant messaging software in the form of an authorized two-dimensional code, so that the operation and maintenance personnel can scan the code for registration according to the authorized two-dimensional code; or, after completing the configuration of the mobile phone number of the operation and maintenance personnel for the operation and maintenance personnel, the management and control platform does not need to transmit the instant messaging application authorization information to the applet in the instant messaging software of the user terminal, and subsequently, when the operation and maintenance personnel remotely controls the device for the first time, automatic registration is performed.

3. An administrator assigns the SSH server in the public network to the corresponding operation and maintenance personnel on the management and control platform (that is, configuring login authorization): Specifically, the management and control platform configures the SSH server in the public network with a remote control authority for the operation and maintenance personnel to obtain a controllable SSH server set (that is, corresponding to the above controllable device set).

4. The management and control platform manages the configured controllable SSH server set and the mobile phone number corresponding to the operation and maintenance personnel.

(2) The management and control platform obtains the controllable device set for which the operation and maintenance personnel has a remote control authority according to the identity information of the operation and maintenance personnel, and after the operation and maintenance personnel selects a device to be remotely controlled device from the controllable device set, the specific process of the user terminal remotely controlling the device selected by the operation and maintenance personnel through the proxy device is as follows:

1. The operation and maintenance personnel inputs a remote control instruction in a command inputting interface of the control device, and the control device responds to the remote control instruction and generates a remote control request based on the remote control instruction; The control device firstly performs SSH connection with the SSH reverse proxy server (that is, a proxy device) and transmits a remote control request to the SSH reverse proxy server based on the SSH connection. After the SSH reverse proxy server receives the remote control request, the SSH reverse proxy server randomly generates a uuid (i.e. an identification code), and then transmits the uuid to the control device through an SSH banner message; and the SSH banner message carries the uuid. Then the control device can use the mechanism of a console ansi escape to process uuid and generate a two-dimensional code pattern. When the SSH reverse proxy server transmits the identification code, an SSH_MSGUSERAUTH_BANNER message (a special message for SSH) in the SSH protocol can also be used for transmitting the identification code to the control device.

2. After the control device receives the SSH banner message, the SSH banner message carries the identification code, and then the control device generates a two-dimensional code based on the identification code and displays the two-dimensional code. At this time, the operation and maintenance user can use the scanning tool in the instant messaging application to scan the two-dimensional code (that is, log in the two-dimensional code), and after the scanning is successful, the instant messaging application jumps to the applet of the instant messaging application, and the identity information of the operation and maintenance user is obtained.

3. If it is the first time for the operation and maintenance personnel to use the applet (that is, the identity information meets the verification condition), it can be understood that the operation and maintenance personnel has not authorized the applet, and the user needs to authorize the applet to obtain a mobile phone number, an instant messaging user identifier (such as openid) and other information; the applet and the management and control platform mutually confirm whether the identity of the operation and maintenance personnel has been registered by the administrator if the management and control platform determines that the identity of the operation and maintenance personnel has been registered; then the management and control platform can search the controllable SSH server set for which the operation and maintenance personnel correspondingly has a remote control authority according to the mobile phone number, and returns the controllable SSH server set for which the operation and maintenance personnel has a remote control authority to the applet, and automatically associates the openid of the applet with the mobile phone number of the operation and maintenance personnel.

4. If it is not the first time for the operation and maintenance personnel to use the applet (that is, the identity information meets the device obtaining condition), it can be understood that the operation and maintenance personnel has authorized the applet. The identity information includes openid, the management and control platform directly queries the controllable SSH server set which the operation and maintenance personnel has authority to access according to the openid, and returns the controllable SSH server set which the operation and maintenance personnel has authority to access to the applet, so that the controllable SSH server set which the operation and maintenance personnel has authority to access is displayed on the applet.

5. A login device is selected: the operation and maintenance personnel selects the SSH server that needs to be remotely controlled from the controllable SSH server set displayed by the applet. Based on the selection operation of a target SSH server in the controllable SSH server set, the applet can transmit the target SSH server to the management and control platform.

6. After receiving the target SSH server transmitted by the applet, the management and control platform returns the corresponding communication address (an IP address), user name, password and other information (i.e. corresponding verification information) of the SSH reverse proxy server to the SSH reverse proxy server.

7. The SSH reverse proxy server initiates an SSH authentication request to the target SSH server.

8. When the authentication for the target SSH server is passed, the SSH reverse proxy server maintains two TCP connections, one connection with the SSH terminal (that is, the user terminal) and the other connection with the target SSH server. The SSH reverse proxy server can be understood as a relay station, which forwards the control data of the SSH terminal to the SSH server and the response data returned by the target SSH server to the SSH terminal.

9. The SSH reverse proxy server can record or block the control data and response data, so that the administrator performs log auditing and operation auditing subsequently.

Based on the data processing system provided above, referring to FIG. 11. FIG. 11 is a schematic flowchart of an access processing method for remotely controlling a terminal according to some embodiments. The method described in some embodiments can be realized through an intelligent device, for example, be performed by the management and control platform 102 in FIG. 1. The method described in some embodiments may include the following operations:

S501: Obtain identity information of a target user from a user terminal, the identity information being obtained and transmitted by scanning a pattern code with the user terminal. The pattern code is generated by the management and control platform according to the identification code transmitted by the proxy device. The target user refers to a user who has a remote control authority for certain devices. The identity information may include at least one of the following: a user identity identifier and an instant messaging user identifier. The identity information can be other real-name authentication user identifier in addition to the instant messaging user identifier, that is, the identity of the target user can be determined by the identity identifier.

In some embodiments, the pattern code is generated by the control device according to the identification code, the identification code is generated by the proxy device according to the received remote control request, and the remote control request is generated by the control device according to a remote control instruction. In some embodiments, the operation and maintenance user can input a remote control instruction through a command inputting interface provided by the control device; the control device generates a remote control request based on the inputted remote control instruction, and transmits the remote control request to the proxy device; the proxy device generates an identification code based on the remote control request, and then transmits the identification code to the control device; and then the control device generates a pattern code according to the identification code. The proxy device generates the identification code according to the remote control request, and the control device generates the pattern code according to the identification code. Reference can be made to the specific implementation process of operation S201 to operation S204 in FIG. 2 of the above embodiment, which is not repeated herein.

In some embodiments, after the user terminal obtains the identity information of the target user by scanning the pattern code, the user terminal directly transmits the identity information of the target user to the management and control platform, and then the management and control platform can receive the identity information transmitted by the user terminal. Or the management and control platform transmits an identity information obtaining request to the user terminal, so that the user terminal obtains the identity information of the target user according to the identity obtaining request, and returns the identity information of the target user to the management and control platform, and then the management and control platform receives the identity information of the target user returned by the user terminal.

S502: Return a controllable device set corresponding to the target user to the user terminal based on the identity information, the controllable device set including: at least one device identifier, each device identifier in the controllable device set indicating a device configured for the target user by a management and control platform; The target user has a remote control authority for the device indicated by the device identifier in the controllable device set.

In some embodiments, the management and control platform can search the controllable device set corresponding to the target user based on the identity information and returns the controllable device set corresponding to the target user to the user terminal based on the controllable device set corresponding to the target user being successfully searched out.

The management and control platform can search the controllable device set corresponding to the target user in different ways based on the identity information for the target user. In some embodiments, the identity information includes a user identity identifier and an instant messaging user identifier, and the management and control platform detects whether the identity information meets verification conditions. When the management and control platform determines that the identity information meets the verification conditions, the management and control platform responds that the identity information meets the verification condition, and searches the controllable device set corresponding to the target user according to the user identity identifier.

The searched-out controllable device set corresponding to the target user is returned to the user terminal based on the controllable device set corresponding to the target user being searched out, and the instant messaging user identifier is associated with the controllable device set.

In some embodiments, the identity information includes an instant messaging user identifier, and the management and control platform detects whether the identity information meets a device obtaining condition. When the management and control platform determines that the identity information meets the device obtaining condition, the management and control platform responds that the identity information meets the device obtaining condition and directly searches the controllable device set corresponding to the target user according to the instant messaging user identifier. Based on the controllable device set corresponding to the target user being searched out, the searched-out controllable device set corresponding to the target user is returned to the user terminal.

In operation S502, as the management and control platform searches the identity information corresponding to the target user according to the identity information, before operation S502 is executed, the management and control platform can provide a management interface through which the controllable device set can be configured for the operation and maintenance user. In some embodiments, the management and control platform displays the management interface based on a first configuration operation, the management interface includes a first setting option and a second setting option, the first setting option is used for setting reference identity information, and the second setting option is used for setting the controllable device set. In some embodiments, the management interface includes an authorization option, generates an identity verification request message based on the triggering operation of the authorization option, and transmits the identity verification request message to the reference user terminal corresponding to the reference identity information set in the first setting option, so that the reference user terminal performs authorization processing based on the identity verification request message; and the reference identity information is associated with the controllable device set based on the received authorization passed message being fed back by the reference user terminal. The management and control platform sets the reference identity information of the operation and maintenance personnel and the controllable device set respectively according to the first setting option and the second setting option, and associates the reference identity information with the controllable device set according to the authorization option. Reference can be made to the foregoing embodiments.

In some embodiments, the management and control platform displays a management interface based on the first configuration operation; the management interface includes an identity information filling area and a controllable device configuration area; the management user can fill in the reference identity information of the operation and maintenance personnel in the identity information filling area and fill in the controllable device set for which the operation and maintenance personnel has a remote control authority in the controllable device configuration area. The management interface also includes a confirmation control which is triggered by the management user; the management and control platform can associate the reference identity information with the controllable device set based on the triggering operation of the confirmation control; and the reference identity information and the controllable device set are saved in the local space of the management and control platform.

S503: Receive a target device identifier transmitted by the user terminal, and obtain verification information of a target device indicated by the target device identifier. In some embodiments, the management and control platform can receive the target device identifier transmitted by the user terminal, and the target device identifier is determined by the user terminal from the controllable device set. In some embodiments, the management and control platform can receive the target device identifier transmitted by a control device, and the target device identifier is selected and determined by a control terminal from the controllable device set. The verification information may include: access information for accessing the target device; and the access information may include a user name and a user name password.

Then the management and control platform can obtain the verification information of the target device indicated by the target device identifier from the local space. In some embodiments, before the management and control platform obtains the verification information of the target device indicated by the target device identifier, the management and control platform can receive a recording request; the recording request is generated when the user terminal receives the confirmation operation of the confirmation option; the recording request carries the access information required for remotely accessing the device; and then the management and control platform can store the access information according to the recording request. It can be understood that the operation and maintenance personnel can first input the access information required for remotely accessing any device in the user terminal, and then the user terminal saves the access information required for remotely accessing any device in the local space of the management and control platform, so that subsequently, the management and control platform can directly obtain the access information of the target device indicated by any device identifier from the local space, and there is no need to input the access information of the target device again. The access information required for remotely accessing the device and carried by the recording request can be inputted through the configuration interface provided by the user terminal. For how to input the access information required for remotely accessing the device in the configuration interface, reference can be made to the above partial embodiments of FIG. 2 and the related descriptions of FIG. 8, which is not be repeated herein.

For the specific implementation of the management and control platform obtaining the verification information of the target device indicated by the target device identifier, reference can be made to the corresponding specific implementation in FIG. 2 of the above-mentioned embodiment, which is not be repeated herein.

S504: Transmit the verification information to the target device to remotely control the target device. The target device can be any device in the public network.

In some embodiments, the management and control platform can transmit the verification information of the target device indicated by the target device identifier to the proxy device to trigger the proxy device to transmit an identity verification request to the target device in the public network.

In some embodiments, the management and control platform can transmit the verification information to the proxy device based on the SSH. The verification information is used for triggering the proxy device to transmit an SSH verification request to the target device corresponding to the address information through a public network SSH server, so that the target device can be remotely controlled according to the SSH verification request.

In some embodiments, the management and control platform obtains the identity information of the target user obtained by the user terminal through scanning the pattern code, returns the controllable device set corresponding to the target user based on the identity information, then obtains the target device identifier and the verification information of the device indicated by the target device identifier, and transmits the verification information to the target device indicated by the target device identifier, so that the remote control on the target device is triggered in a more efficient way. In the process of realizing remote control on the target device, as the identity of the operation and maintenance user is determined by scanning the pattern code instead of directly inputting the user name and password to start the connection, unauthorized users can be prevented better from impermissibly and remotely controlling some machines and devices through violent testing of the user name and password, and the security of remote control is also ensured to a certain extent.

Based on the data processing system provided above, referring to FIG. 12. FIG. 12 is a schematic flowchart of an access processing method for remotely controlling a terminal according to some embodiments. The method described in some embodiments can be realized through an intelligent device, for example, be performed by the user terminal 101 in FIG. 1. The method described in some embodiments may include the following operations S601 to S604:

S601: Scan a pattern code based on a detected scanning operation, and obtain the identity information of a target user after the scanning is successful, the pattern code being generated by the control device according to the identification code. The pattern code may be a two-dimensional code, a bar code, etc., and the identity information may include at least one of the following: a user identity identifier and an instant messaging user identifier.

In some embodiments, when the user terminal scans the pattern code based on the detected scanning operation, and after the scanning is successful, the user terminal directly obtains the identity information of the target user, that is, the identity information may include the user identity identifier. In another embodiment, an instant messaging application runs in the user terminal, and different applets run in the instant messaging application; The user terminal can use the scanning tool in the instant messaging application to scan the pattern code based on the detected scanning operation, and jumps from the instant messaging application to the applet in the instant messaging application after the scanning is successful; then the applet automatically obtains the identity information of the target user, that is, the identity information can include the user identity identifier and the instant messaging user identifier.

Figure 13:
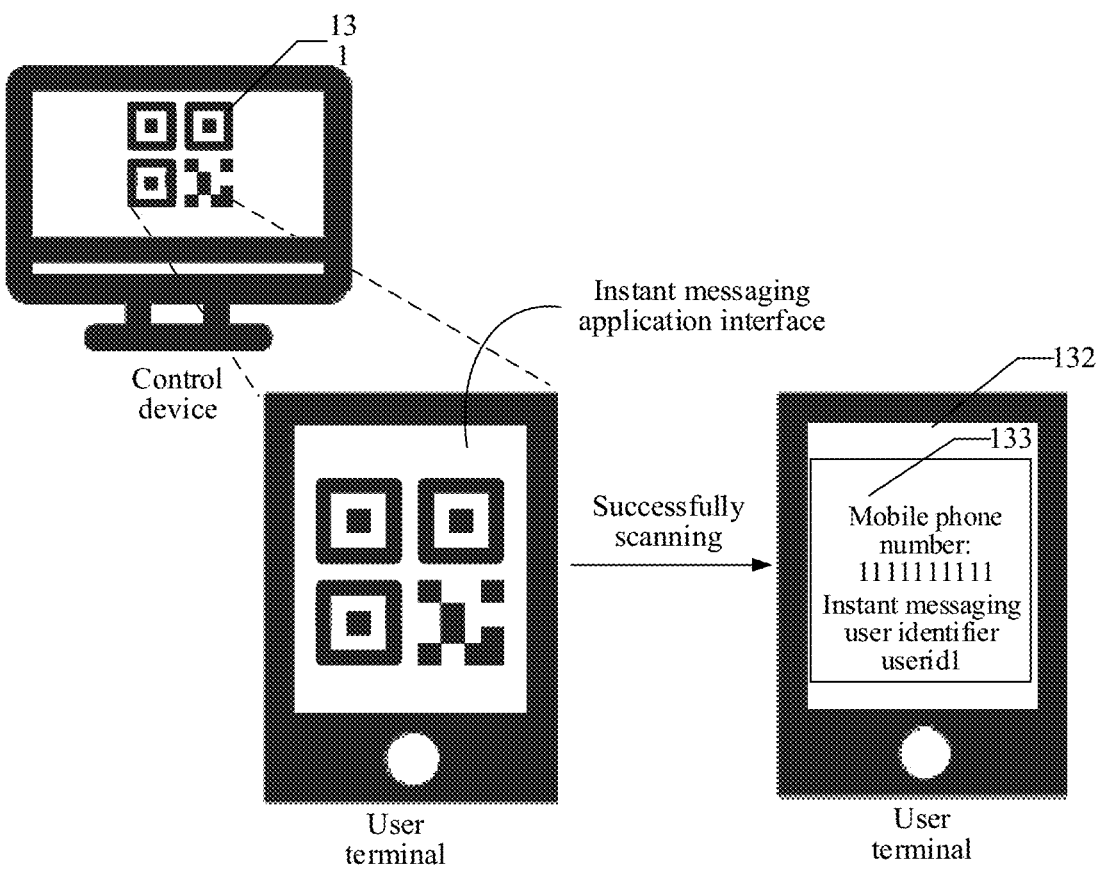
FIG. 13 is a schematic diagram of scanning a two-dimensional code to obtain identity information according to some embodiments.

For example, as shown in FIG. 13, a two-dimensional code 131 is displayed in the control device, and the operation and maintenance user can trigger the scanning tool in the instant messaging application to scan the two-dimensional code 131 in the control device, that is, the user terminal scans the pattern code 131 in the control device based on the detected scanning operation, jumps from the instant messaging application to the applet in the instant messaging application after the scanning is successful, and displays the identity information 133 of the target user in the applet interface 132. The identify information includes a mobile phone number 111111111111, and an instant messaging user identifier userid1.

S602: Transmit the identity information to the management and control platform;

In some embodiments, after obtaining the identity information of the target user, the user terminal directly transmits the identity information of the target user to the management and control platform; or the user terminal receives an identity information obtaining request transmitted by the management and control platform, and then transmits identity information to the management and control platform based on the identity information obtaining request.

S603: Receive a controllable device set transmitted by the management and control platform, the controllable device set being obtained by the management and control platform based on the identity information, and the controllable device set including: at least one device identifier, each device identifier in the controllable device set indicating a device configured for the target user by the management and control platform;

In some embodiments, after the user terminal receives the controllable device set, the controllable device set can be displayed in a device proxy page or applet of the user terminal. The controllable device set includes a plurality of device identifiers. Each device identifier is used for indicating the device configured by the management and control platform for the target user, that is, the target user has a remote control authority for the device indicated by each device identifier.

S604: Transmit the target device identifier selected by the selection operation to the management and control platform based on the selection operation of the target device identifier in the controllable device set.

The selection operation can be an operation of clicking the target device identifier in the controllable device set. Or the selection operation may be an operation of sliding the target device identifier in the controllable device set, for example, an operation of sliding the target device identifier in the controllable device set towards the right or towards the left. The selection operation may also be an operation of voice input. For example, when the operation and maintenance personnel inputs "I want to select the target device identifier" by voice, the user terminal can perform voice recognition on the voice input "I want to select the target device identifier", and then recognizes "the target device identifier" by voice; and then the user terminal obtains the target device identifier and transmits the target device identifier to the management and control platform.

In some embodiments, the user terminal transmits the target device identifier selected by the selection operation to the management and control platform, so that the management and control platform obtains the verification information of the target device indicated by the target device identifier based on the target device identifier.

When the target user wants to remotely control the target device, the access information required for accessing the target device can be inputted through the second configuration operation. In some embodiments, the user terminal displays a configuration interface based on the second configuration operation, and the configuration interface includes a device access information option. The device access information option is used for inputting the access information required for remotely accessing the device. Then the target user can trigger the device access information option; and the user terminal responds to the triggering operation of the device access information option, and then directly inputs the access information required for remotely accessing the device on the configuration interface. In another embodiment, the user terminal responds to the triggering operation of the device access information option, then displays the information inputting interface, and inputs the access information required for remotely accessing the device in the information inputting interface. For the specific implementation of inputting the access information required for remotely accessing the device in the information inputting interface, reference can be made to partial implementations in FIG. 2, which is not repeated herein. Any operation and maintenance user can input the access information required for accessing the device in the configuration interface.

In some embodiments, the configuration interface includes a confirmation option; the confirmation option is used for receiving a confirmation operation; and the confirmation option can be triggered when the target user does not want to configure the access information for accessing the target device for many times. When the user terminal receives the confirmation operation on the confirmation option, the user terminal transmits a recording request to the management and control platform to request the management and control platform to store the access information, so that subsequently, the management and control platform can directly obtain the access information.

In some embodiments, the user terminal can obtain the identity information of the target user by scanning the pattern code, transmits the identity information to the management and control platform, then receives the controllable device set transmitted by the management and control platform based on the identity information, responds to the selection operation of the target device identifier in the controllable device set, and transmits the target device identifier selected by the selection operation to the management and control platform; and the identity information of the target user is obtained by scanning the pattern code with no need for the target user to input the identity information. The problems of being mined and extorted caused by blasting attacks of unauthorized users such as hackers, and the easy loss and forgetting of passwords in the distribution process can be well prevented, and thus, the safety of remote control on the device can be well guaranteed by scanning the pattern code. The controllable device set is displayed through the user terminal, so that the operation and maintenance personnel can know the controllable device set with an access authority more intuitively, which is convenient for the operation and maintenance user to select the device to be controlled conveniently and quickly.

Figure 14:
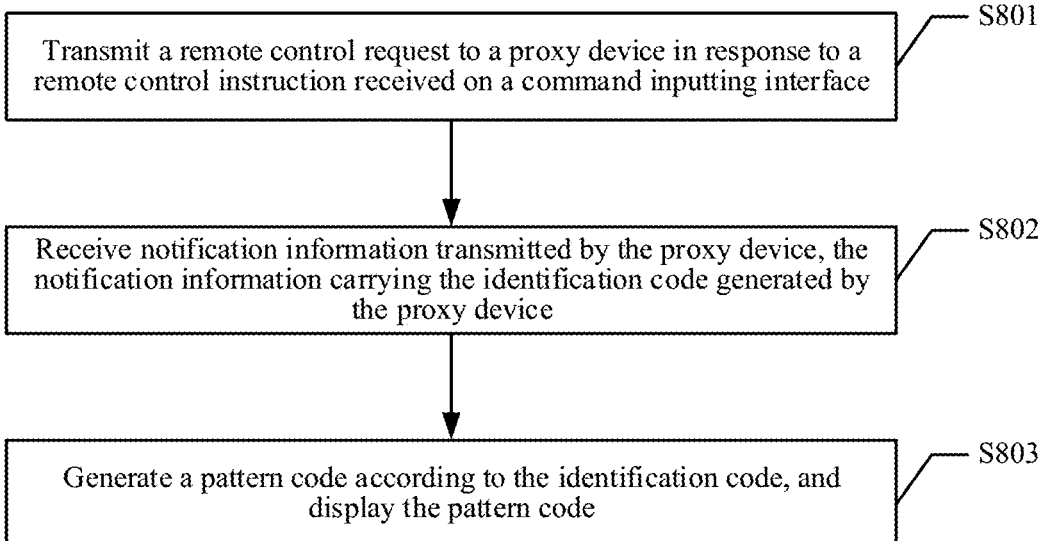
FIG. 14 is a schematic flowchart of an access processing method for remotely controlling a terminal according to some embodiments.

Based on the data processing system provided above, referring to FIG. 14. FIG. 14 is a schematic flowchart of an access processing method for remotely controlling a terminal according to some embodiments. The method described in some embodiments can be realized through an intelligent device, for example, be performed by a control device 104 in FIG. 1. The method described in some embodiments may include the following operations S801 to S803:

S801: Transmit a remote control request to a proxy device based on a remote control instruction received on a command inputting interface, the remote control request instructing the proxy device to generate an identification code.

In some embodiments, the control device responds to the remote control instruction received on the command inputting interface, and generates the remote control request according to the remote control instruction; and then the control device can establish a communication connection with the proxy device and transmits the remote control request to the proxy device through the communication connection for triggering the proxy device to generate the identification code.

S802: Receive notification information transmitted by the proxy device, the notification information carrying the identification code generated by the proxy device.

S803: Generate a pattern code according to the identification code, and display the pattern code.

In some embodiments, the control device can generate the pattern code through a pattern code generation interface according to the identification code transmitted by the proxy device and a character string generated by the control device itself, and then displays the pattern code, so that the user terminal scans the pattern code based on the detected scanning operation and obtains the identity information of the target user after the scanning is successful.

In some embodiments, after the user terminal scans the pattern code of the control device to obtain the identity information of the target user and transmits the identity information of the target user to the management and control platform, the control device can receive the controllable device set transmitted by the management and control platform. The controllable device set is obtained by the management and control platform based on the identity information of the target user; and the identity information of the target user is obtained by the user terminal scanning the pattern code. The controllable device set includes: device identifiers. The device identifier in the controllable device set is used for indicating a device configured for the target user by the management and control platform. Then the control device receives the controllable device set transmitted by the management and control platform and displays the controllable device set. The target user can select the target device identifier in the displayed controllable device set, and then the control device transmits the target device identifier selected by the selection operation to the management and control platform based on the selection operation of the target device identifier in the controllable device set. In some embodiments the control device transmitting the target device identifier selected by the selection operation to the management and control platform based on the selection operation of the target device identifier in the controllable device set, and reference can be made to embodiments of the user terminal transmitting the target device identifier selected by the selection operation to the management and control platform based on the selection operation of the target device identifier in the controllable device set in FIG. 2, which is not repeated herein.

In some embodiments, the operation and maintenance personnel (such as a target users) can input the access information for accessing the target device in the control device. In some embodiments, the control device can display a configuration interface based on a third configuration operation. The configuration interface includes a device access information option, or the configuration interface includes a device access information option and a confirmation option. The device access information option is used for inputting the access information required for remotely accessing the device. The confirmation option is used for receiving a confirmation operation; and a recording request is transmitted to the management and control platform to request the management and control platform to store the access information when the confirmation operation is received on the confirmation option. For the specific implementation of inputting the access information for accessing the target device in the control device, reference can be made to the specific implementation of inputting the access information for accessing the target device in the user terminal, which is not repeated herein.

In some embodiments, the control device transmits the remote control request to the proxy device based on a remote control instruction received on the command inputting interface; the remote control request is used for instructing the proxy device to generate the identification code; and the control device receives the notification information transmitted by the proxy device, the notification information carries the identification code generated by the proxy device, then generates the pattern code according to the identification code, and displays the pattern code, which is beneficial to subsequent identity authentication by using the pattern code.

Based on the data processing system provided above, referring to FIG. 15. FIG. 15 is a schematic flowchart of an access processing method for remotely controlling a terminal according to some embodiments. The method described in some embodiments can be realized through an intelligent device, for example, be performed by the proxy device 103 in FIG. 1. The method described in some embodiments may include the following operations S901 to S905:

S901: Generate an identification code for the control device based on a remote control request received from the control device.

In some embodiments, the proxy device may first establish a communication connection with the control device, for example, the proxy device may first establish an SSH connection with the control device, then receives the remote control request transmitted by the control device, and randomly generates the identification code for the control device based on the remote control request received from the control device.

S902: Transmit the notification information carrying the identification code to the control device, the notification information triggering the control device to generate the pattern code according to the identification code and display the pattern code.

In some embodiments, the proxy device may transmit the notification information carrying the identification code to the control device based on the communication connection.

S903: Obtain verification information about a target device indicated by a target device identifier of a management and control platform according to the identification code, the verification information including: access information for accessing the target device.

In some embodiments, the management and control platform may transmit the verification information about the target device indicated by the target device identifier to the proxy device, and the identification code is also carried in the process of transmitting the verification information about the target device indicated by the target device identifier. The proxy device can receive the verification information transmitted by the management and control platform according to the identification code.

In some embodiments, the verification information includes the address information of the target device indicated by the target device identifier. The proxy device receives the verification information transmitted by the management and control platform based on SSH. The verification information is used for triggering the proxy device to transmit an SSH authentication request to the target device corresponding to the address information through the public network SSH server.

S904: Transmit an identity authentication request to the target device, the identity authentication request carrying the verification information. The target device can be any device in the public network.

In some embodiments, after receiving the verification information transmitted by the management and control platform based on the SSH protocol, the proxy device transmits the SSH authentication request (i.e., an identity authentication request) to the target device corresponding to the address information through the public network SSH server; and the SSH authentication request carries the verification information therein.

S905: Perform data transmission processing for the user terminal and the target device based on the verification for the verification information being passed.

In some embodiments, the target device can verify the verification information based on the received identity verification request. When the verification for the verification information by the target device is passed, a verification passed message is transmitted to the proxy device. The proxy device can establish a communication connection with the target device based on the received verification passed message; and the proxy device also establishes a communication connection with the user terminal.

The process that the proxy device performs data transmission processing for the user terminal and the target device is as follows: the user terminal transmits control data to the target device, the proxy device first receives the control data transmitted by the user terminal, and the control data includes a task identifier; then the proxy device transmits the control data to the target device remotely controlled by the user terminal based on the task identifier; then, after receiving the control data transmitted by the proxy device, the target device feeds back the target response data to the user terminal based on the control data; and then the proxy device receives the target response data fed back by the target device to the user terminal, and forwards the target response data to the user terminal.

In some embodiments, the proxy device can obtain communication data. The communication data includes control data of the user terminal to the target device, or target response data fed back to the user terminal by the target device, or control data of the user terminal to the target device and target response data fed back to the user terminal by the target device; and a communication log is generated according to the communication data, so that the administrator performs communication log auditing and operation auditing subsequently. When the proxy device verifies the communication data based on the firewall and the security group policy, and the verification for the communication data fails, the proxy device can also block the transmission of the communication data.

In some embodiments, as there may be multiple user terminals, each user terminal can remotely control a target device, and each user terminal and the corresponding target device need to transmit data at the same time. Therefore, the proxy device can also establish a task identifier for data transmission between each user terminal and the corresponding target device, so as to realize pre-authentication of communication data. That is, the communication data for interaction between the user terminal and the target device includes a task identifier, and the proxy device transmits the corresponding communication data between the user terminal and the target device according to the task identifier.

In some embodiments, the proxy device transmits an identity authentication request to the target device based on the verification information of the target device, and the identity authentication request carries the verification information. When the verification for the verification information is passed, the proxy server performs data transmission processing for the user terminal and the target device, which can prevent the user terminal from directly controlling the target device remotely and ensure the safety of the remote control on the device. Moreover, the proxy device forwards the data for the user terminal and the target device, which can realize the auditing of the transmitted data, so as to facilitate the subsequent management of user playback, traceability and the like.

Based on the above access processing method for remotely controlling the terminal, referring to FIG. 16. FIG. 16 is a structural schematic diagram of an access processing apparatus for remotely controlling the terminal according to some embodiments. The access processing apparatus for remotely controlling the terminal can be applied to the management and control platform in the corresponding embodiment in FIG. 2 or FIG. 11. Specifically, the access processing apparatus for remotely controlling the terminal can be a computer program (including a program code) running in the management and control platform, for example, the access processing apparatus for remotely controlling the terminal is application software; The access processing apparatus for remotely controlling the terminal can be configured to execute the corresponding operations in the method provided by some embodiments.

A processing module 1001 is configured to obtain identity information of a target user from a user terminal, the identity information being obtained and transmitted by scanning a pattern code with the user terminal; and return a controllable device set corresponding to the target user to the user terminal based on the identity information, the controllable device set including: at least one device identifier, each device identifier in the controllable device set indicating a device configured for the target user by a management and control platform.

A communication module 1002 is configured to receive a target device identifier transmitted by the user terminal.

The processing module 1001 is further configured to obtain verification information of a target device indicated by the target device identifier, the target device identifier being selected and determined by the user terminal from the controllable device set, and the verification information including: access information for accessing the target device.

The communication module 1002 is further configured to transmit the verification information to the target device indicated by the target device identifier to remotely control the target device.

In some embodiments, the identity information includes a user identity identifier and an instant messaging user identifier, and when the controllable device set corresponding to the target user is returned to the user terminal based on the identity information, the processing module 1001 can be specifically configured to:

search the controllable device set corresponding to the target user according to the user identity identifier based on the identity information meeting a verification condition; and return the searched-out controllable device set corresponding to the target user to the user terminal based on the controllable device set corresponding to the target user being searched out, and associate the instant messaging user identifier with the controllable device set.

In some embodiments, the identity information includes the instant messaging user identifier, and when the controllable device set corresponding to the target user is returned to the user terminal based on the identity information, the processing module 1001 can be specifically configured to:

directly search the controllable device set corresponding to the target user according to the instant messaging user identifier based on the identity information meeting a device obtaining condition; and return the searched-out controllable device set corresponding to the target user to the user terminal based on the controllable device set corresponding to the target user being searched out.

In an embodiment, the processing module 1001 is further configured to:

display a management interface based on a first configuration operation, the management interface including a first setting option and a second setting option, the first setting option setting reference identity information, and the second setting option setting the controllable device set.

In some embodiments, the management interface includes an authorization option, and the processing module 1001 is further configured to: generate an identity verification request message based on the triggering operation for the authorization option.

The communication module 1002 is further configured to transmit the identity verification request message to the reference user terminal corresponding to the reference identity information set in the first setting option, so that the reference user terminal performs authorization processing based on the identity verification request message.

The processing module 1001 is further configured to associate the reference identity information with the controllable device set based on a received authorization passed message being fed back by the reference user terminal.

In some embodiments, the verification information further includes: address information of the target device indicated by the target device identifier. When the verification information is transmitted to the target device indicated by the target device identifier, the communication module can be specifically configured to:

transmit the verification information to the proxy device based on an SSH, the verification information triggering the proxy device to transmit an SSH authentication request to the target device corresponding to the address information through a public network SSH server.

In some embodiments, the communication module 1002 is further configured to receive a recording request, the recording request being generated by the user terminal after receiving a confirmation operation of a confirmation option, and the recording request carrying access information required for remotely accessing the device.

The processing module 1001 is further configured to store the access information according to the recording request.

In some embodiments, the pattern code is generated by the control device according to the identification code, the identification code is generated by the proxy device according to the received remote control request, and the remote control request is generated by the control device according to a remote control instruction.

It can be understood that a function of each functional module of the access processing apparatus for remotely controlling the terminal in some embodiments may be specifically implemented according to the method in the foregoing method embodiment. For a specific implementation process thereof, reference may be made to related descriptions in FIG. 2 or FIG. 11 of the foregoing method embodiment, which is not further described herein.

In some embodiments, the management and control platform obtains the identity information of the target user obtained by the user terminal through scanning the pattern code, returns the controllable device set corresponding to the target user based on the identity information, then obtains the target device identifier and the verification information of the device indicated by the target device identifier, and transmits the verification information to the target device indicated by the target device identifier, so that the remote control on the target device is triggered in a more efficient way. In the process of realizing remote control on the target device, as the identity of the operation and maintenance user is determined by scanning the pattern code instead of directly inputting the user name and password to start the connection, unauthorized users can be prevented better from impermissibly and remotely controlling some machines and devices through violent testing of the user name and password, and the security of remote control is also ensured to a certain extent.

Based on the access processing method for remotely controlling the terminal, some embodiments also provide an access processing apparatus for remotely controlling the terminal. For the structural schematic diagram of the access processing apparatus for remotely controlling the terminal, reference can be made to FIG. 16. The apparatus can be applied to the user terminal in the above corresponding embodiment of FIG. 2 or FIG. 12. Specifically, the apparatus can be a computer program (including a program code) running in the user terminal, for example, the access processing apparatus for remotely controlling the terminal is application software. The apparatus according to some embodiments includes the following modules.

A processing module 1001 is configured to scan a pattern code based on a detected scanning operation, and obtain the identity information of a target user after the scanning is successful, the pattern code being generated by the control device according to the identification code.

A communication module 1002 is configured to transmit the identity information to the management and control platform; receive a controllable device set transmitted by the management and control platform, the controllable device set being obtained by the management and control platform based on the identity information, and the controllable device set including: at least one device identifier, each device identifier in the controllable device set indicating a device configured for the target user by a management and control platform; transmit the target device identifier selected by the selection operation to the management and control platform based on the selection operation of the target device identifier in the controllable device set.

In an embodiment, the processing module 1001 is further configured to: display a configuration interface based on a second configuration operation, the configuration interface including a device access information option, or the configuration interface including a device access information option and a confirmation option. The device access information option is used for inputting access information required for remotely accessing the device. The confirmation option is used for receiving a confirmation operation, and transmitting a recording request to the management and control platform to request the management and control platform to store the access information during receiving the confirmation operation on the confirmation option.

It can be understood that a function of each functional module of the access processing apparatus for remotely controlling the terminal in some embodiments may be specifically implemented according to the method in the foregoing method embodiment. For a specific implementation process thereof, reference may be made to related descriptions in FIG. 2 or FIG. 12 of the foregoing method embodiment, which is not further described herein.

In some embodiments, the user terminal can obtain the identity information of the target user by scanning the pattern code, transmits the identity information to the management and control platform, then receives the controllable device set transmitted by the management and control platform based on the identity information, responds to the selection operation of the target device identifier in the controllable device set, and transmits the target device identifier selected by the selection operation to the management and control platform; and the identity information of the target user is obtained by scanning the pattern code with no need for the target user to input the identity information. The problems of being mined and extorted caused by blasting attacks of unauthorized users such as hackers, and the easy loss and forgetting of passwords in the distribution process can be well prevented, and thus, the safety of remote control on the device can be well guaranteed by scanning the pattern code. The controllable device set is displayed through the user terminal, so that the operation and maintenance personnel can know the controllable device set with an access authority more intuitively, which is convenient for the operation and maintenance user to select the device to be controlled conveniently and quickly.

Based on the access processing method for remotely controlling the terminal, some embodiments also provide an access processing apparatus for remotely controlling the terminal. For a schematic structural diagram of the apparatus, reference can be made to FIG. 16. The access processing apparatus for remotely controlling the terminal can be applied to the control device in the above corresponding embodiment of FIG. 2 or FIG. 14. Specifically, the apparatus can be a computer program (including a program code) running in the control device, for example, the access processing apparatus for remotely controlling the terminal is application software. The apparatus according to some embodiments includes the following modules.

A communication module 1002 is configured to transmit a remote control request to a proxy device based on a remote control instruction received on a command inputting interface, the remote control request instructing the proxy device to generate an identification code; and receive notification information transmitted by the proxy device, the notification information carrying the identification code generated by the proxy device.

A processing module 1001 is configured to generate a pattern code according to the identification code and display the pattern code.

It can be understood that a function of each functional module of the access processing apparatus for remotely controlling the terminal in some embodiments may be specifically implemented according to the method in the foregoing method embodiment. For a specific implementation process thereof, reference may be made to related descriptions in FIG. 2 or FIG. 14 of the foregoing method embodiment, which is not further described herein.

In some embodiments, the control device transmits the remote control request to the proxy device based on a remote control instruction received on the command inputting interface; the remote control request is used for instructing the proxy device to generate the identification code; and the control device receives the notification information transmitted by the proxy device, the notification information carries the identification code generated by the proxy device, then generates the pattern code according to the identification code, and displays the pattern code, which is beneficial to subsequent identity authentication by using the pattern code.

Based on the access processing method for remotely controlling the terminal, some embodiments also provides an access processing apparatus for remotely controlling the terminal. For the structural schematic diagram of the apparatus, reference may be made to the structural schematic diagram of the data apparatus shown in FIG. 16. The access processing apparatus for remotely controlling the terminal can be applied to the proxy device in the above corresponding embodiment of FIG. 2 or FIG. 15. Specifically, the apparatus can be a computer program (including a program code) running in the proxy device, for example, the access processing apparatus for remotely controlling the terminal is application software. The apparatus includes the following modules.

A processing module 1001 is configured to generate an identification code for the control device based on a remote control request received from a control device.

A communication module 1002 is configured to transmit notification information carrying the identification code to the control device, the notification information triggering the control device to generate a pattern code according to the identification code and display the pattern code.

A processing module 1001 is configured to obtain verification information about a target device indicated by the target device identifier of a management and control platform according to the identification code, the verification information including: access information for accessing the target device.

A communication module 1002 is further configured to transmit an identity authentication request to the target device, the identity authentication request carrying the verification information.

The processing module 1001 is configured to perform data transmission processing for the user terminal and the target device based on the verification for the verification information being passed.

In some embodiments, after performing data transmission processing for the user terminal and the target device based on the verification for the verification information being passed, the processing module 1001 is configured to:

obtain communication data, the communication data including control data of the user terminal to the target device, or target response data fed back to the user terminal by the target device, or control data of the user terminal to the target device and target response data fed back to the user terminal by the target device; and generate a communication log according to the communication data.

In some embodiments, communication data for interaction between the user terminal and the target device includes a task identifier, and the proxy device transmits the corresponding communication data between the user terminal and the target device according to the task identifier.

It can be understood that a function of each functional module of the access processing apparatus for remotely controlling the terminal in some embodiments may be specifically implemented according to the method in the foregoing method embodiment. For a specific implementation process thereof, reference may be made to related descriptions in FIG. 2 or FIG. 15 of the foregoing method embodiment, which is not further described herein.

The term "module" refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry.

In some embodiments, the proxy device transmits an identity authentication request to the target device based on the verification information of the target device, and the identity authentication request carries the verification information. When the verification for the verification information is passed, the proxy server performs data transmission processing for the user terminal and the target device, which can prevent the user terminal from directly controlling the target device remotely and ensure the safety of the remote control on the device. Moreover, the proxy device forwards the data for the user terminal and the target device, which can realize the auditing of the transmitted data, so as to facilitate the subsequent management of user playback, traceability and the like.

Figure 17:
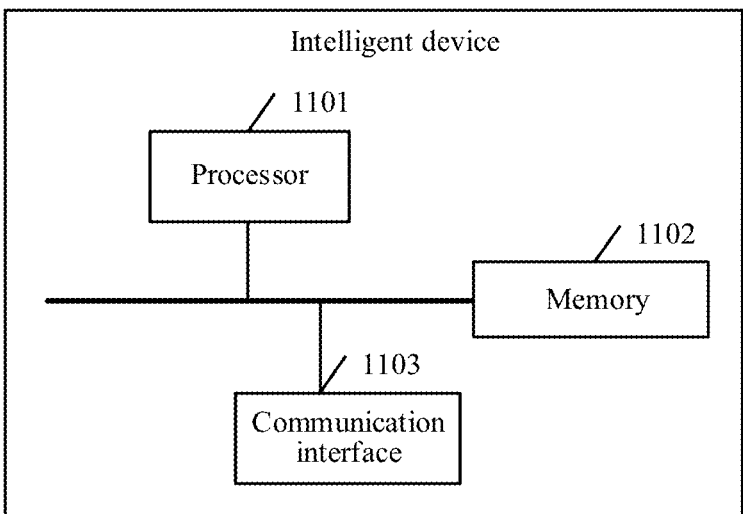
FIG. 17 is a schematic structural diagram of an intelligent device according to some embodiments.

FIG. 17 is a schematic structural diagram of an intelligent device provided by some embodiments. The intelligent device can be realized as the management and control platform, the user terminal, the control device or the proxy device described in the above embodiment. As shown in FIG. 11, the intelligent device can include: a processor 1101, a memory 1102, and a communications interface 1103. The processor 1101, the memory 1102 and the communications interface 1103 are connected through a bus 1104. The memory 1102 is configured to store a computer programs including program instructions; and the processor 1101 is configured to execute the program instructions stored in the memory 1102.

In some embodiments, based on the intelligent device is the management and control platform in the above corresponding embodiment of FIG. 2 or FIG. 11, the processor 1101 performs the operations performed by the management and control platform in the above embodiment by running the computer program in the memory 1102.

In some embodiments, based on the intelligent device is the user terminal in the above corresponding embodiment of FIG. 2 or FIG. 12, the processor 1101 performs the operations performed by the user terminal in the above embodiment by running the computer program in the memory 1102.

In some embodiments, based on the intelligent device is the control device in the above corresponding embodiment of FIG. 2 or FIG. 14, the processor 1101 performs the operations performed by the control device in the above embodiment by running the computer program in the memory 1102.

In some embodiments, based on the intelligent device is the proxy device in the above corresponding embodiment of FIG. 2 or FIG. 15, the processor 1101 performs the operations performed by the proxy device in the above embodiment by running the computer program in the memory 1102.

In some embodiments, the processor 1101 may be a central processing unit (CPU), and the processor 1101 may also be a general-purpose processor, a digital signal processor (DSP), an application-specific integrated circuit (ASIC), a field-programmable gate array (FPGA) or other programmable logic devices, a discrete gate or a transistor logic device, a discrete hardware component, etc. The general-purpose processor may be a microprocessor, or the processor may be any conventional processor or the like.

The memory 1102 may include a read-only memory and a random access memory, and provides an instruction and data to the processor 1101. A part of the memory 1102 may further include a non-volatile random access memory.

Some embodiments further provide a computer-readable storage medium in which a computer program is stored. The processor runs the computer program, so that the intelligent device executes the method provided in the previous embodiment.

Some embodiments also provide a computer program product or a computer program, which includes a computer instruction stored in the computer-readable storage medium. The processor of the intelligent device reads the computer instruction from the computer-readable storage medium and executes the computer instruction, so that the intelligent device executes the method provided by the previous embodiment.

A person of ordinary skill in the art may understand that all or some of the processes of the foregoing methods may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

The foregoing embodiments are used for describing, instead of limiting the technical solutions of the disclosure.

A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An access processing method for remotely controlling a terminal, performed by a management and control platform server, comprising:

obtaining identity information of a target user from a user terminal based on an identification code generated by a proxy device;

returning a controllable device set corresponding to the target user to the user terminal based on the identity information, the controllable device set comprising: a plurality of device identifiers, each device identifier in the controllable device set indicating a device configured for the target user;

receiving, from the user terminal, a target device identifier selected from the controllable device set, and obtaining verification information of a target device indicated by the target device identifier, the verification information comprising: access information for accessing the target device; and controlling the verification information to be transmitted to the target device to allow, based on verification of the verification information passing, access and remote control of the target device via the proxy device by:

transmitting the verification information to the proxy device based on a secure shell protocol (SSH) to control the proxy device to transmit an SSH authentication request to the target device.

2. The access processing method according to claim 1, wherein the identity information comprises a user identity identifier and an instant messaging user identifier, and the returning comprises:

searching the controllable device set corresponding to the target user according to the user identity identifier based on the identity information meeting a verification condition; and returning the searched controllable device set corresponding to the target user to the user terminal based on the controllable device set corresponding to the target user being searched out, and associating the instant messaging user identifier with the controllable device set.

3. The access processing method according to claim 1, wherein the identity information comprises an instant messaging user identifier, and the returning comprises:

directly searching the controllable device set corresponding to the target user according to the instant messaging user identifier based on the identity information meeting a device obtaining condition; and returning the searched controllable device set corresponding to the target user to the user terminal based on the controllable device set corresponding to the target user being searched out.

4. The access processing method according claim 1, further comprising:

displaying a management interface based on a first configuration operation, the management interface comprising a first setting option and a second setting option, the first setting option setting reference identity information, and the second setting option setting the controllable device set.

5. The access processing method according to claim 4, wherein the management interface comprises an authorization option, and the access processing method further comprises:

generating an identity verification request message based on a triggering operation for the authorization option, and transmitting the identity verification request message to a reference user terminal corresponding to the reference identity information, so that the reference user terminal performs authorization processing based on the identify verification request message; and associating the reference identity information with the controllable device set based on an authorization message being fed back by the reference user terminal.

6. The access processing method according to claim 1, wherein the verification information further comprises: address information of the target device indicated by the target device identifier, wherein the SSH authentication request corresponds to the address information through a public network SSH server.

7. The access processing method according to claim 1, further comprising:

receiving a recording request from the user terminal, the recording request carrying access information required for remotely accessing the target device; and storing the access information according to the recording request.

8. The access processing method according to claim 1, wherein the identity information is obtained by scanning a pattern code with the user terminal and transmitting the scanned code.

9. An access processing apparatus for remotely controlling a terminal comprising:

at least one memory configured store program code; and at least one processor configured to read the program code and operate as instructed by the program code, the program code comprising:

processing code configured to cause the at least one processor to obtain identity information of a target user from a user terminal based on an identification code generated by a proxy device; return a controllable device set corresponding to the target user to the user terminal based on the identity information, the controllable device set comprising: a plurality of device identifiers, each device identifier in the controllable device set indicating a device configured for the target user by a management and control platform; and communication code configured to cause the at least one processor to receive, from the user terminal, a target device identifier selected from the controllable device set, wherein the processing code is further configured to cause the at least one processor to obtain verification information of a target device indicated by the target device identifier, and the verification information comprising: access information for accessing the target device; and the communication code is further configured to cause the at least one processor to control the verification information to be transmitted to the target device to allow, based on verification of the verification information passing, access and remote control of the target device via the proxy device by causing the at least one processor to:

transmit the verification information to the proxy device based on a secure shell protocol (SSH) to control the proxy device to transmit an SSH authentication request to the target device.

10. The access processing apparatus according to claim 9, wherein the identity information comprises a user identity identifier and an instant messaging user identifier, and the processing code is further configured to cause the at least one processor to:

search the controllable device set corresponding to the target user according to the user identity identifier based on the identity information meeting a verification condition; and return the searched controllable device set corresponding to the target user to the user terminal based on the controllable device set corresponding to the target user is searched out, and associate the instant messaging user identifier with the controllable device set.

11. The access processing apparatus according to claim 9, wherein the identity information comprises an instant messaging user identifier, and the processing code is further configured to cause the at least one processor to:

directly search the controllable device set corresponding to the target user according to the instant messaging user identifier based on the identity information meeting a device obtaining condition; and return the searched controllable device set corresponding to the target user to the user terminal based on the controllable device set corresponding to the target user is searched out.

12. The access processing apparatus according to claim 9, wherein the processing code is further configured to cause the at least one processor to:

display a management interface based on a first configuration operation, the management interface comprising a first setting option and a second setting option, the first setting option setting reference identity information, and the second setting option setting the controllable device set.

13. The access processing apparatus according to claim 12, wherein the management interface comprises an authorization option;

the communication code is further configured to cause the at least one processor to generate an identity verification request message based on a triggering operation for the authorization option, and transmit the identity verification request message to a reference user terminal corresponding to the reference identity information, so that the reference user terminal performs authorization processing based on the identify verification request message; and the processing code is further configured to cause the at least one processor to associate the reference identity information with the controllable device set based on an authorization message being fed back by the reference user terminal.

14. The access processing apparatus according to claim 9, wherein the verification information further comprises: address information of the target device indicated by the target device identifier, wherein the SSH authentication request corresponds to the address information through a public network SSH server.

15. The access processing apparatus according to claim 9, wherein the communication code is further configured to cause the at least one processor to receive a recording request from the user terminal, the recording request carrying access information required for remotely accessing the target device, and the processing code is further configured to cause the at least one processor to store the access information according to the recording request.

16. The access processing apparatus according to claim 9, wherein the identity information is obtained by scanning a pattern code with the user terminal and transmitting the scanned code.

17. A non-transitory computer-readable storage medium, storing computer code that when executed by at least one processor causes the at least one processor to:

obtain identity information of a target user from a user terminal based on an identification code generated by a proxy device;

return a controllable device set corresponding to the target user to the user terminal based on the identity information, the controllable device set comprising: a plurality of device identifiers, each device identifier in the controllable device set indicating a device configured for the target user;

receive, from the user terminal, a target device identifier selected from the controllable device, and obtaining verification information of a target device indicated by the target device identifier, the verification information comprising: access information for accessing the target device; and control the verification information to be transmitted to the target device to allow, based on verification of the verification information passing, access and remote control of the target device via the proxy device by transmitting the verification information to the proxy device based on a secure shell protocol (SSH) to control the proxy device to transmit an SSH authentication request to the target device.

18. The non-transitory computer-readable storage medium according to claim 17, wherein the identity information comprises a user identity identifier and an instant messaging user identifier, and the return comprises:

searching the controllable device set corresponding to the target user according to the user identity identifier based on the identity information meeting a verification condition; and returning the searched controllable device set corresponding to the target user to the user terminal based on the controllable device set corresponding to the target user is searched out, and associating the instant messaging user identifier with the controllable device set.

19. The non-transitory computer-readable storage medium according to claim 17, wherein the identity information comprises an instant messaging user identifier, and the return comprises:

directly searching the controllable device set corresponding to the target user according to the instant messaging user identifier based on the identity information meeting a device obtaining condition; and returning the searched controllable device set corresponding to the target user to the user terminal based on the controllable device set corresponding to the target user being searched out.

20. The non-transitory computer-readable storage medium according to claim 17, wherein the computer code further causes the at least one processor to:

display a management interface based on a first configuration operation, the management interface comprising a first setting option and a second setting option, the first setting option setting reference identity information, and the second setting option setting the controllable device set.

* * * * *